United States Patent
Lin et al.

(10) Patent No.: US 10,410,351 B2
(45) Date of Patent: *Sep. 10, 2019

(54) AUTOMATICALLY SEGMENTING IMAGES BASED ON NATURAL LANGUAGE PHRASES

(71) Applicant: Adobe Inc., San Jose, CA (US)

(72) Inventors: Zhe Lin, Fremont, CA (US); Xin Lu, Mountain View, CA (US); Xiaohui Shen, San Jose, CA (US); Jimei Yang, Santa Clara, CA (US); Chenxi Liu, Baltimore, MD (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,609

(22) Filed: Aug. 29, 2018

(65) Prior Publication Data
US 2019/0035083 A1 Jan. 31, 2019

Related U.S. Application Data

(63) Continuation of application No. 15/458,887, filed on Mar. 14, 2017, now Pat. No. 10,089,742.

(51) Int. Cl.
*G06K 9/00* (2006.01)
*G06T 7/11* (2017.01)
(Continued)

(52) U.S. Cl.
CPC .............. *G06T 7/11* (2017.01); *G06F 17/277* (2013.01); *G06F 17/2715* (2013.01);
(Continued)

(58) Field of Classification Search
None
See application file for complete search history.

(56) References Cited

U.S. PATENT DOCUMENTS 9,704,054 B1 * 7/2017 Tappen .................... G06K 9/46
2008/0275694 A1 * 11/2008 Varone ................ G06F 17/2785
704/9

(Continued)

OTHER PUBLICATIONS

Liu, C., Lin, Z., Shen, X., Yang, J., Lu, X, & Yuille, A. (2017). Recurrent Multimodal Interaction for Referring Image Segmentation. In Proceedings of the IEEE Conference on Computer Vision and Pattern Recognition (pp. 1281-1280).

*Primary Examiner* — Hadi Akhavannik
(74) *Attorney, Agent, or Firm* — Shook, Hardy & Bacon, L.L.P.

(57) ABSTRACT

The invention is directed towards segmenting images based on natural language phrases. An image and an n-gram, including a sequence of tokens, are received. An encoding of image features and a sequence of token vectors are generated. A fully convolutional neural network identifies and encodes the image features. A word embedding model generates the token vectors. A recurrent neural network (RNN) iteratively updates a segmentation map based on combinations of the image feature encoding and the token vectors. The segmentation map identifies which pixels are included in an image region referenced by the n-gram. A segmented image is generated based on the segmentation map. The RNN may be a convolutional multimodal RNN. A separate RNN, such as a long short-term memory network, may iteratively update an encoding of semantic features based on the order of tokens. The first RNN may update the segmentation map based on the semantic feature encoding.

20 Claims, 11 Drawing Sheets

(51) Int. Cl.
  *G06F 17/27* (2006.01)
  *G10L 15/26* (2006.01)
(52) U.S. Cl.
  CPC .......... *G06F 17/2785* (2013.01); *G10L 15/26* (2013.01); *G06T 2207/20084* (2013.01); *G06T 2207/20101* (2013.01)

(56) References Cited

U.S. PATENT DOCUMENTS

| | | | |
|---|---|---|---|
| 2009/0060351 A1* | 3/2009 | Li | G06K 9/4642 |
| | | | 382/224 |
| 2015/0019204 A1* | 1/2015 | Simard | G06F 17/2785 |
| | | | 704/9 |
| 2015/0205783 A1* | 7/2015 | Anisimovich | G06F 17/2705 |
| | | | 704/2 |
| 2015/0224893 A1* | 8/2015 | Motokawa | H01M 2/1077 |
| | | | 429/99 |
| 2016/0117386 A1* | 4/2016 | Ajmera | G06F 16/35 |
| | | | 707/740 |
| 2017/0235848 A1* | 8/2017 | Van Dusen | H04L 41/04 |
| | | | 705/12 |

* cited by examiner

AUTOMATICALLY SEGMENTING IMAGES BASED ON NATURAL LANGUAGE PHRASES

CROSS-REFERENCE TO RELATED APPLICATIONS

This application is a Continuation of U.S. patent application Ser. No. 15/458,887, filed Mar. 14, 2017 and entitled AUTOMATICALLY SEGMENTING IMAGES BASED ON NATURAL LANGUAGE PHRASES, the entirety of which is herein incorporated by reference.

BACKGROUND

Applications for image enhancing, annotating, redacting, or other such image-editing tasks are now widespread. Many such applications include functionalities to segment an image into multiple regions. For instance, a user may wish to identify a portion of the image that is associated with an object in the foreground and another portion of the image that is associated with the background of the image. Some applications enable a user to draw a bounding box around such regions. However, such manual functionalities often require significant user interaction and provide only gross-level feature segmentation.

Other previously available systems enable a user to provide a natural language phrase to segment an image. Such systems identify latent features of the image and latent features of the entire phrase. The latent features of the image and the phrase are combined to segment the image. More specifically, these previously available systems process the entirety of the phrase to detect latent features of the phrase. Only after the entirety of the phrase has been processed, the latent features of the image and the phrase are combined to segment the image. In this regard, the latent features of the image are combined with the latent features of the phrase only once and at the end of the phrase processing. Thus, the segmentation of the image is based only on a single interaction of the image and the phrase latent features after the entirety of the phrase has been processed. Segmenting an image upon on analysis of an entire expression, however, can result in an inaccurate segmentation (e.g., incorrect spatial arrangement). By way of example only, based on the expression "the dog on the right" without the image perspective, existing technologies may not recognize whether to focus on the "dog" or "on the right" with regard to image segmentation.

SUMMARY

Embodiments of the present invention are directed towards methods and systems for automatically segmenting images based on ordered sequences of text (e.g., tokens or words) in natural language phrases. In this regard, embodiments described herein iteratively segment an image based on the particular ordered sequence of words included in the natural language phrase. The meaning of natural language phrases is dependent on the order of the words in the phrases. Analyzing an image in association with an ordered sequence of a natural language phrase enables a more accurate segmentation because the interaction between the image and the phrase takes into the account the order of the words in the phrase.

The various embodiments enable a user to provide an image and a natural language phrase. The phrase may refer to an object depicted in the image. The various embodiments automatically locate the object in the image and select the portion of the image that represents the object. More specifically, when the natural language phrase is indicative of an object (or region) depicted in the image, pixels corresponding to the indicated object (or region) are automatically identified and/or selected. Such automatic segmenting enables a user to isolate specific clusters of pixel corresponding to the object (or region) of interest, as indicated via the natural language phrase.

In at least one non-limiting embodiment, a method includes receiving an image and a natural phrase in the form of an n-gram. The image includes pixels. For instance, the image may include H×W pixels, where H and W are positive integers. The n-gram includes an ordered set of natural language tokens that reference a region of the image. For instance, the n-gram may reference an objected depicted within the image. In at least one embodiment, the n-gram may be generated based on a received natural language phrase. The phrase may reference an object depicted within a region of the image. In some embodiments, the phrase may be received as audio data encoding the natural language phrase as spoken by a user. Textual data may be generated based on the received audio data and a speech-to-text model. The n-gram may be generated based on the generated textual data.

The method may include generating an image data structure that encodes image features of the image. For instance, such image features may be latent and/or hidden image features identified via convolutional models. The method may further include generating an ordered set of token data structures based on the set of tokens. Each token data structure may encode latent and/or hidden features of the corresponding token.

The method further includes generating and iteratively updating a segmentation data structure based on a combination (or concatenation) of the image data structure and the set of token data structures. The segmentation data structure encodes a segmentation mask (or map). The segmentation map may be represented and/or structures as a two-dimensional (2D) tensor. The segmentation map identifies which pixels are included in the region of the image referenced by the n-gram. The method may generate and provide a segmented image based on the image and the segmentation map.

Generating the segmented image may include segmenting the image based on the segmentation map. Providing the segmented image may include transmitting the segmented image to a user-computing device and/or displaying the segmented image on a display device of the user-computing device. In at least one embodiment, providing the image may include transmitting the segmented image to remote and/or local storage and/or storing the segmented image on the remote and/or local storage.

More particularly, the image data structure may be an image feature map or an image feature tensor. Essentially the image data structure encodes a mapping between image features and corresponding blocks or portions of the pixels. The image features may be identified within the image based on an image feature identification model. In some embodiments, the image feature identification model may be implemented via a trained fully convolution neural network (FCN).

The ordered set of token data structures may be based on a natural language model. Each of the token data structures encodes semantic features of a corresponding token of the ordered set of tokens. Thus, the order of the set of token data structures is based on and corresponds to the order of the set of natural language tokens. In some embodiments, each of the token data structures is a token vector based on the corresponding token. In some embodiments, a token data element is a token data structure and/or a token vector.

For instance, the natural language model may be a trained word embedding model. The word embedding model is employed to map each token to a token vector in a multidimensional space. In some embodiments, the token vector space includes 1000 or more dimensions. Via the generation of token vectors, the tokens are embedded in the multidimensional space. The distance between pairs of tokens in the space is indicative of semantic similarities between the pairs of tokens. Such word embedding models may be trained via the generation of semantic distributions within large semantic corpuses. In at least one embodiment, the "Word2Vec" language model is employed to embed the tokens within the token space.

During the iterative updating of the segmentation data structure, iterative and/or successive updates of the segmentation data structure are based on the segmentation data structure and a combination of the image data structure and one of the tokens data structures. The specific token data structure combined with the image data structure for the various iterations is based on the order of the set of tokens. That is, there is a one-to-one mapping between the order of the set of tokens and the order of iterative updates of the segmentation data structure. The order of the iterations of updating the segmentation data structure are ordered corresponding to the order of the set of tokens.

In some embodiments, the method includes generating and iteratively updating an n-gram data structure that encodes semantic features of the order of the set of tokens. Iterative updates of the n-gram data structure are based on the n-gram data structure and one of the token data structures. There may be a one-to-one mapping between the order of the set of tokens and the order of iterative updates of the n-gram data structure. The order of the iterations of updating the n-gram data structure are ordered corresponding to the order of the set of tokens. The iterative updates of the segmentation data structure may be further based on a combination of the image data structure and the updated n-gram data structure corresponding to the order of the set of tokens.

In a least some embodiments, the iterative updates of the n-gram data structure is based on a trained recurrent neural network (RNN), such as but not limited to a trained long short-term memory (LSTM) neural network. Such a RNN propagates the iterative updates of the n-gram data structure. In various embodiments, the iterative updates of the segmentation data structure are based on another or separate RNN that propagates the iterative updates of the segmentation data structure. In other embodiments, the iterative updates of the segmentation data structure are based on a convolutional multimodal recurrent neural network (mRNN) that propagates the iterative updates of the segmentation data structure.

The various embodiments may include training one or more of the RNNs based on training data. For instance, machine-learning training methods may be applied, such as but not limited to back-propagation.

DETAILED DESCRIPTION

Figure 1:
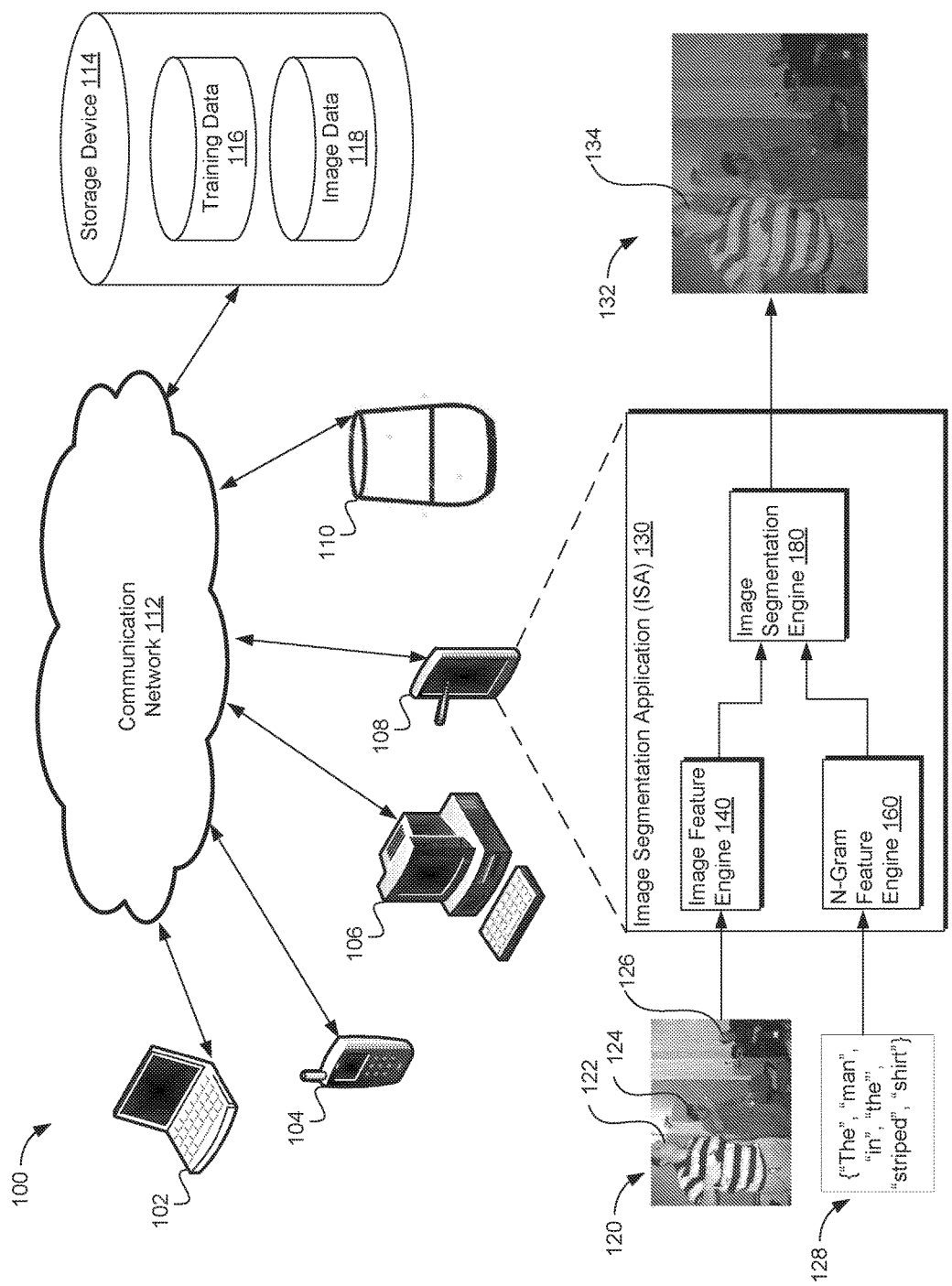
FIG. 1 illustrates an exemplary embodiment of a system enabled to segment an image based on a natural language phrase that is consistent with the various embodiments discussed herein.

As used herein, the term "natural language phrase" or simply "phrase" may be used to indicate one or more sentences or sentence fragments in any of one or more natural languages. Thus, a natural language phrase may include an ordered set or sequence of natural language words, spaces, punctuation marks, and the like.

As used herein, the term "token" refers to the basic units of a natural language phrase. That is, a token may be a contiguous string of characters between spaces and/or punctuation marks within a phrase. For instance, a token may be a natural language word included in a phrase. Thus, a token may be a lexical item.

As used herein, the terms "semantic features" of a token or another lexical unit may refer to the conceptual components of the token. The concept evoked via a token (i.e. the token's meaning) may be discernible from the differences and similarities between the token's semantic features with the semantic features of other tokens and the concepts evoked by those other tokens. Thus, semantic features of a token may be semantic components and/or semantic properties of the token.

As used herein, the term "n-gram" refers to a data encoding, representing, and/or otherwise indicating a natural phrase. In various embodiments, the data may be structured data. In other embodiments, the data may be unstructured data. Essentially, an n-gram is data comprising each token within a natural language phrase, wherein the data structure conserves the order of tokens in the phrase. Thus, an n-gram may be an ordered set or sequence of tokens. For instance, the sentence fragment "a half full cup of coffee" is a natural language phrase that includes 5 tokens: "a", "half", "full", "cup", "of", "coffee", in a particular order. The phrase may be structured, encoded, represented, or otherwise indicated by the n-gram data structure: {"a", "half", "full", "cup", "of", "coffee"}. This particular n-gram is a 5-gram.

As used herein, the terms "latent features" and "hidden features" may be used synonymously to refer to features of an object that are not directly observable. For instance, various models discussed herein are employed to determine and encode latent features of images, tokens, n-grams, and the like, i.e. features that may not be explicitly observable from the images, tokens, and n-grams, without the assistance of the employed models.

As used herein, the term "encoding" may refer to a representation of underlying information. For instance, information may be encoded in various structures or elements, such as, but not limited to, vectors, tensors, data arrays, and the like. Such information represented by various encodings may include, but is not otherwise limited to images, latent and/or hidden features of images, tokens, n-grams, and the like, as well as various mappings. For instance, in a non-limiting embodiment, image features may be encoded in one or more data structures, such as but not limited to a tensor.

Briefly stated, various embodiments are directed towards segmenting images based on ordered sequences of text (e.g., tokens or words) in natural language phrases. The various embodiments enable a user to provide an image and a natural language phrase. The phrase may refer to an object depicted in the image. The various embodiments automatically locate the object in the image and select the portion of the image that represents the object. When the natural language phrase is indicative of an object (or region) depicted in the image, pixels corresponding to the indicated object (or region) are automatically identified and/or selected. Such segmenting enables a user to isolate specific clusters of pixel corresponding to the object (or region) of interest, as indicated via the natural language phrase. By automatically isolating and/or selecting pixels indicated via the phrase, a user may more readily edit images, based on objects and/or regions rather than performing manual pixel-wise edits.

Many previously available image segmentation systems have enabled users to draw or otherwise manually provide a bounding shape (i.e. a bounding box) to segment a region of interest within an image.

Other previously available image segmentation systems enable a user to provide a natural language phrase to segment an image. Although other previously available systems employ the latent features of the image and the phrase to segment the image, these previously available systems only segment the image after the entirety of the phrase is processed. That is to say, these previously available systems employ phrase-to-image interactions, rather than token-to-image interactions, to segment the image.

Thus, these previously available systems generate a phrase-to-image interaction, i.e. the latent features of the image are combined with the latent features of the phrase only once and at the end of the phrase processing. Thus, the segmentation of the image is based only on a single interaction of the image and the phrase latent features after the entirety of the phrase has been processed. Such phrase-to-image interactions may neglect word-to-image interactions, i.e. a sequential processing of word-to-image interactions that iteratively segment the image based on the order of the words included in the phrase Furthermore, these phrase-based previously available systems are generally constrained via the format of the natural language phrase, i.e. the phrase must be structured via a predetermined phrasing format. When the object (or region) of interest cannot be indicated in the constrained phrase format, such systems have difficulty in identifying the image region to segment. For instance, if an image depicted two or more objects of similar type, previously available systems may not be enabled to differentiate between the two objects, based on the formatted phrase.

In contrast to these previously available systems, the various embodiments iteratively segment the image based on the particular ordered sequence of natural language words (i.e. tokens) included in the natural language phrase. Thus, the embodiments segment an image based on the sequence of tokens included in the phrase. Each token is sequentially selected in the order indicated in the natural phrase. The segmentation is initially generated based on the first token. The segmentation is iteratively updated based on a current segmentation and the next token in the natural language phrase. The iterative segmentation continues until each token has been processed and the segmentation updated based on each token, processed in the sequence of the phrase. Accordingly, the various embodiments iteratively employ multiple word-to-image interactions, rather than a single phrase-to-image interaction performed at the end of the processing of the phrase.

Utilizing such an iterative segmentation in accordance with an ordered sequence of natural language words enables a user to speak a phrase indicative of an object depicted within an image and, in response, be automatically provided with an accurately segmented image. Advantageously, the various embodiments are enabled to distinguish between two or more objects of similar or equivalent type depicted within the image based on an arbitrarily structured natural language phrase. The various embodiments employ trained natural language models (NLMs), such as but not limited to word embedding models to determine the "meaning" of a phrase beyond just nouns included in the phrase. That is, the embodiments are enabled to identify and employ features included in the phrase to distinguish between multiple objects depicted in the image.

For instance, a region located in the left side of an image may depict an adult male and another region located in the right side of the image may depict a female child. Based on the natural language phrases such as (but not limited to) "the person on the left," "the male," or "the adult," the various embodiments will generate a segmented image isolating only those pixels that are associated with the adult male. Similarly, the various embodiments will generate a segmented image isolating only the pixels associated with the female child based on phrases such as (but not limited to) "the person on the right," "the female," or "the child."

Furthermore, utilizing embodiments described herein, a shape associated with a boundary of the segmented pixels may be irregular, i.e. the segmented pixels need not lie within a polygon or some other region defined via a series of line segments. For instance, when segmenting an object of interest (e.g., a human) depicted within an object, only those pixels that correspond to the object of interest are segmented. Thus, the shape of the boundary of the segmented region may be irregular. That is, the shape of the boundary of the segmented pixels conforms to the object of interest, and not to a bounding box or other geometric object.

In addition, because various embodiments employ natural language models trained on large corpuses of natural language phrases to process the user-provided phrase, the user-provided phrase does not have to conform to a predetermined structure and/or format. Rather, the natural language phrase indicating an object of interest depicted in the image may be unstructured or unformatted.

In operation and at a high-level, a user may view an image displayed on a display device of a user-computing device. The embodiments employ one or more trained fully convolutional neural networks (FNNs) to automatically identify and/or determine various features of the image. In response to viewing the image, the user may speak (or manually type) a natural language phrase indicating an object (or region) of interest depicted in the image.

Speech-to-text services automatically generate a textual n-gram based on the spoken phrase. The various embodiments employ one or more natural language models (NLMs) to sequentially process each of the tokens of the n-gram. The image can be iteratively segmented based on the sequence of processed tokens and the image features. Briefly, various recurrent neural networks (RNN) are trained and employed to iteratively segment the image based on a combination of the image features and the sequence of processed tokens. Essentially, one or more RNNs propagate (or remember) and employ a current segmentation to update the segmentation in the next iterative operation.

Various embodiments employ a recurrence of intermediate segmentation (RIS) model in the iterative segmentations. In such RIS embodiments, once processed via a NLM, the tokens may be sequentially employed to determine various features of the n-gram based on the order of the tokens. For instance, in some embodiments, a trained RNN is iteratively employed to determine/identify various features of the n-gram and iteratively update the n-gram features based on the sequential processing of the tokens. In one embodiment, a trained long short-term memory (LSTM) neural network may be employed to iteratively determine the features of the n-gram.

In RIS embodiments, the features of the n-gram and the image may be combined for processing by another RNN. The other RNN may be trained to segment the image based on the combination of image features and n-gram features. This RNN may generate and iteratively update the segmentation of the image based on the iterative updates to the n-gram features. The iterative updates to the n-gram features are based on the sequential processing of the tokens. The iterative updates to the segmentation (i.e. intermediate segmentation) continue until the terminal token has been employed to update the segmentation.

Thus, for the first iteration of the segmentation process, the segmentation is based on the first token of the n-gram. Via the internal states of the second RNN, the initial segmentation is remembered (or propagated) for the next iteration. For the second iteration of the segmentation process, the (intermediate) segmentation is iteratively updated based on at least the second token of the n-gram and the propagated initial segmentation. These iterative operations of sequentially selecting a token of the n-gram and updating the segmentation based on the selected token and the propagated segmentation continues until the last (or terminal) token of the n-gram has been processed. That is, the iterative segmentation continues until each token has contributed (in sequence of the n-gram) to the segmentation.

In other embodiments, a multimodal recurrence neural network (mRNN) model is employed to iteratively segment the image based on the natural language phrase. In contrast to RIS embodiments, rather than employing two separate recurring (i.e. iteratively updated and propagated) data structures: the iteratively updated n-gram features and the iteratively updated segmentation, mRNN embodiments combine the information into a single mRNN. Thus, such embodiments unify the information associated with the n-gram features and the segmentation into a single multi-dimensional and multi-modality RNN (mRNN). In some embodiments, the multi-dimensional and multi-modality RNN is a multimodal LSTM (mLSTM). The multimodal information (token information, image information, spatial information) and the like interact during the iterative segmentation.

In mRNN embodiments, the processed tokens are sequentially combined with the features of the image. An mRNN combines the modalities of each of the image features and the processed tokens to iteratively update the segmentation. Such embodiments enable the interaction of rich multimodal information.

Exemplary Image Segmentation System

FIG. 1 illustrates an exemplary embodiment of a system 100 enabled to segment an image based on a natural language phrase that is consistent with the various embodiments discussed herein. System 100 includes various user-computing devices, such as, but not limited to, laptop 102, smartphone 104, desktop 106, tablet 108, virtual assistant (VA) device 110, and the like. Any user-computing device, such as but not limited to user-computing devices 102-108 may be enabled to provide at least a portion of the services and/or functionalities associated with VA device 110. For instance, a VA service may be embedded within software operating on smartphone 104.

In other embodiments, system 100 may include more or less user-computing devices. For instance, system 100 may include additional mobile devices, wearable devices, and the like. An exemplary, but non-limiting embodiment of a computing device is discussed in conjunction with at least computing device 900 of FIG. 9. A general or specific communication network, such as but not limited to communication network 112, may communicatively couple at least a portion of user-computing devices 102-110.

Communication network 112 may be any communication network, including virtually any wired and or wireless communication technologies, wired and/or wireless communication protocols, and the like. It should be understood that communication network 112 may be virtually any communication network that communicatively couples a plurality of computing devices and databases in such a way as to enable users of computing devices to exchange information via the computing devices.

System 100 may include one or more storage devices, such as but not limited to storage device 114. Storage device 114 may include volatile and non-volatile storage of digital data. Storage device 114 may include non-transitory storage media. Communication network 112 may communicatively couple storage device 114 to at least a portion of user-computing devices 102-110. In some embodiments, storage device 114 may be a logical storage device logically distributed over multiple physical storage devices. Thus, storage device 114 may be a virtualized storage device. For instance, one or more "cloud storage" services and/or service providers may provide, implement, and/or enable storage device 114.

Storage device 114 may store training data 116. As discussed herein, training data 116 may include various training data employed to iteratively generate and/or train the various models discussed herein. Various embodiments of iteratively generating such models are discussed throughout, including but not limited to process 700 of FIG. 7. Storage device 114 may also storage image data 118. For instance, image 120 may be included in image data 118.

One or more user-computing devices 102-110 may host, execute, or otherwise enable functionalities of image segmentation application (ISA) 130. FIG. 1 shows tablet 108 hosting ISA 130. Other embodiments are not so constrained. For instance, ISA 130 may be distributed amongst a plurality of computing devices. In at least one embodiment, the functionalities of ISA 130 are provided via web and/or cloud services.

Figure 2:
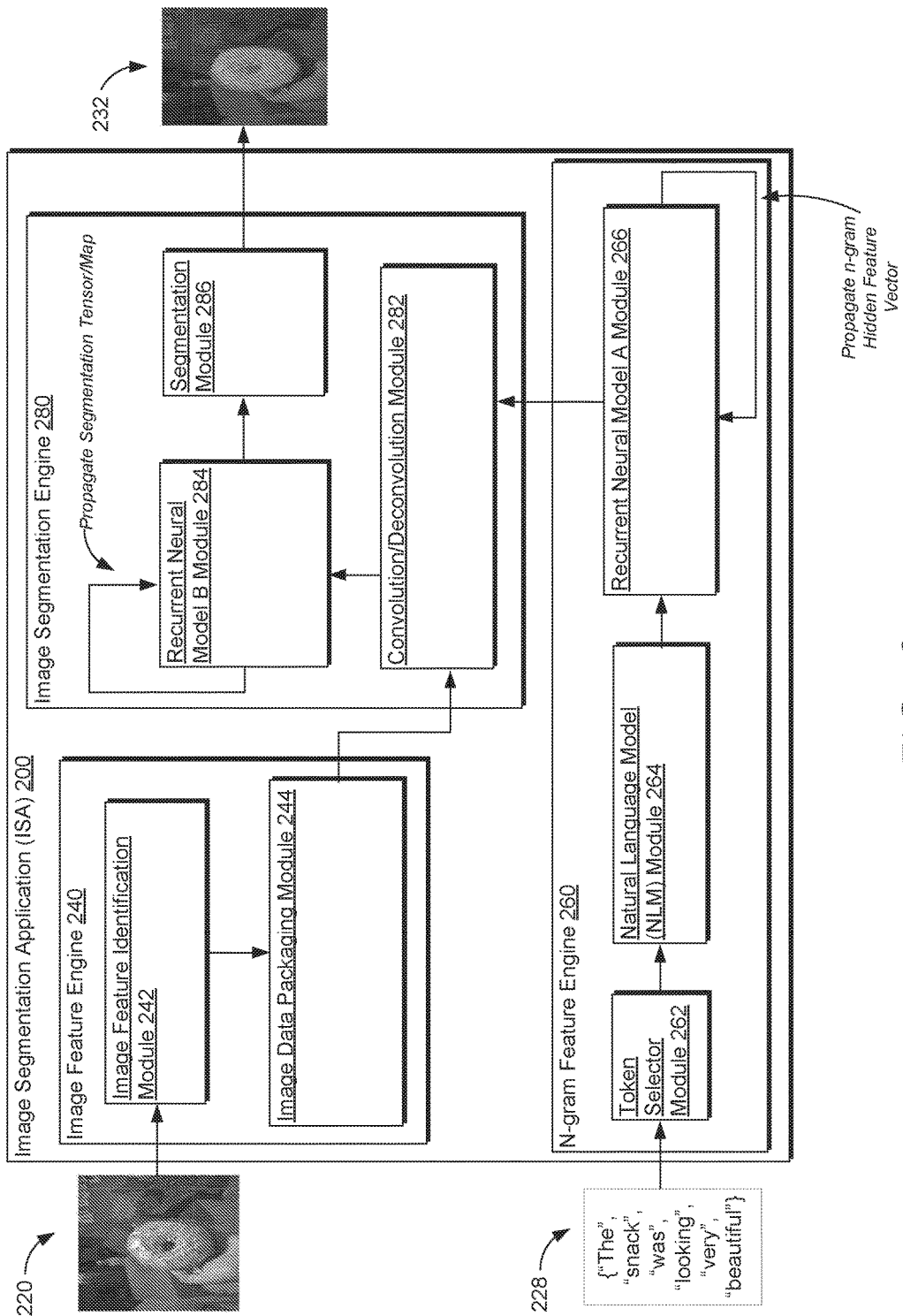
FIG. 2 illustrates an exemplary embodiment of an image segmentation application (ISA) for segmenting an image based on a natural language phrase and a recurrence of an intermediate segmentation model that is consistent with the various embodiments presented herein.
Figure 4A:
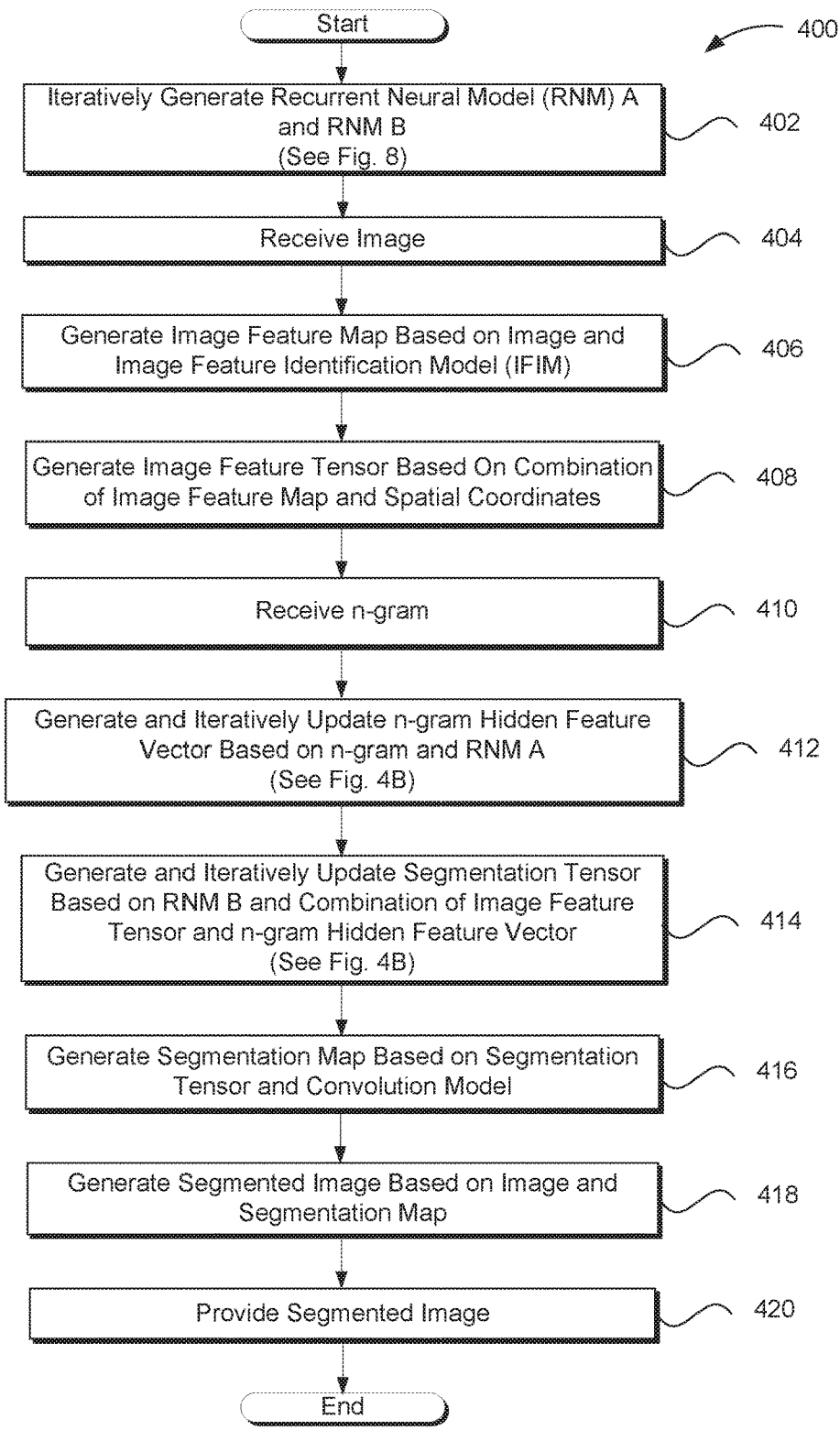
FIG. 4A illustrates one embodiment of a process flow for segmenting an image based on a natural language phrase and a recurrence of intermediate segmentation model that is consistent with the various embodiments presented herein.
Figure 4B:
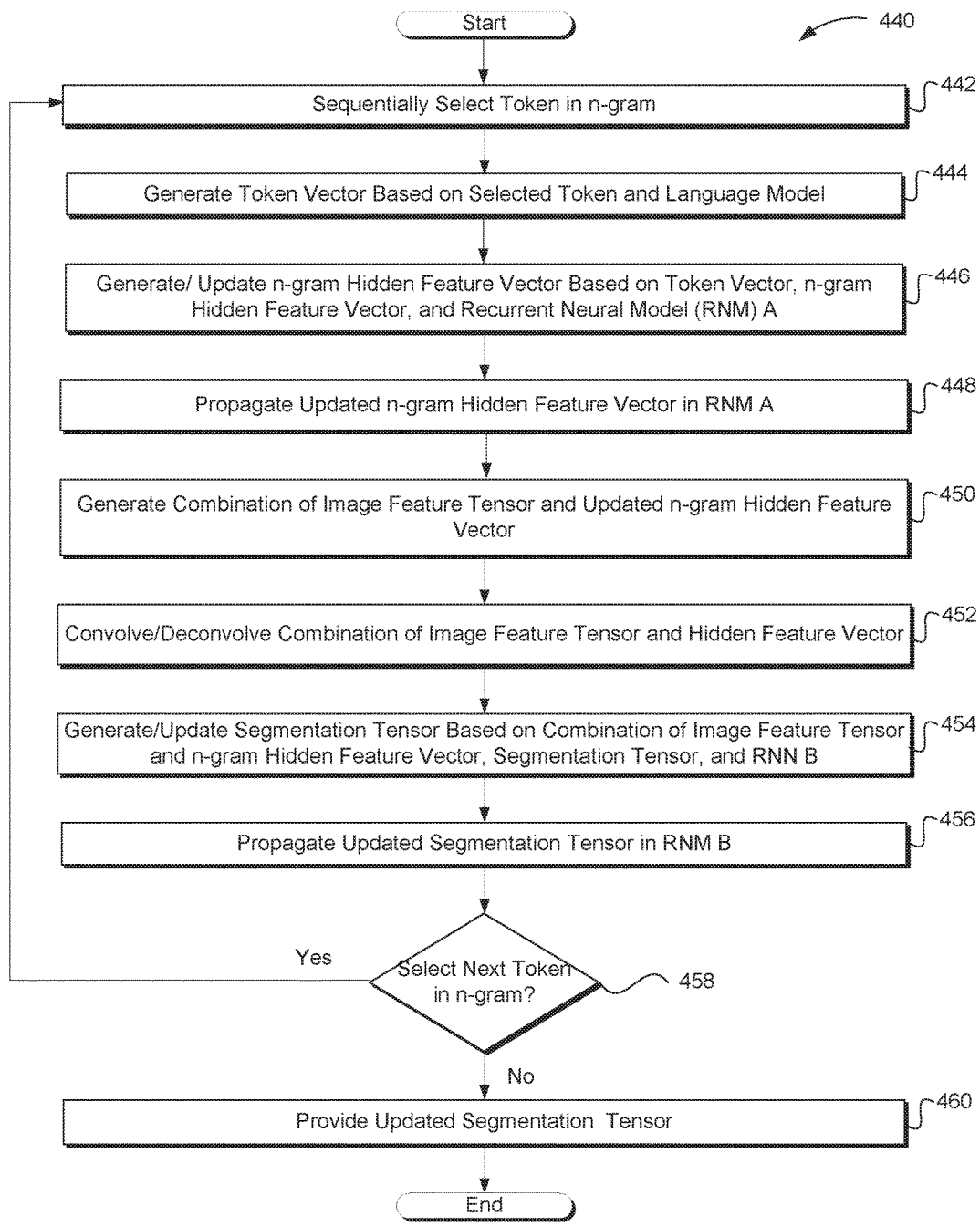
FIG. 4B illustrates one embodiment of a process flow for employing the ISA of FIG. 2 to iteratively generate a segmentation tensor based on a natural language phrase and a recurrence of intermediate segmentation model.
Figure 5:
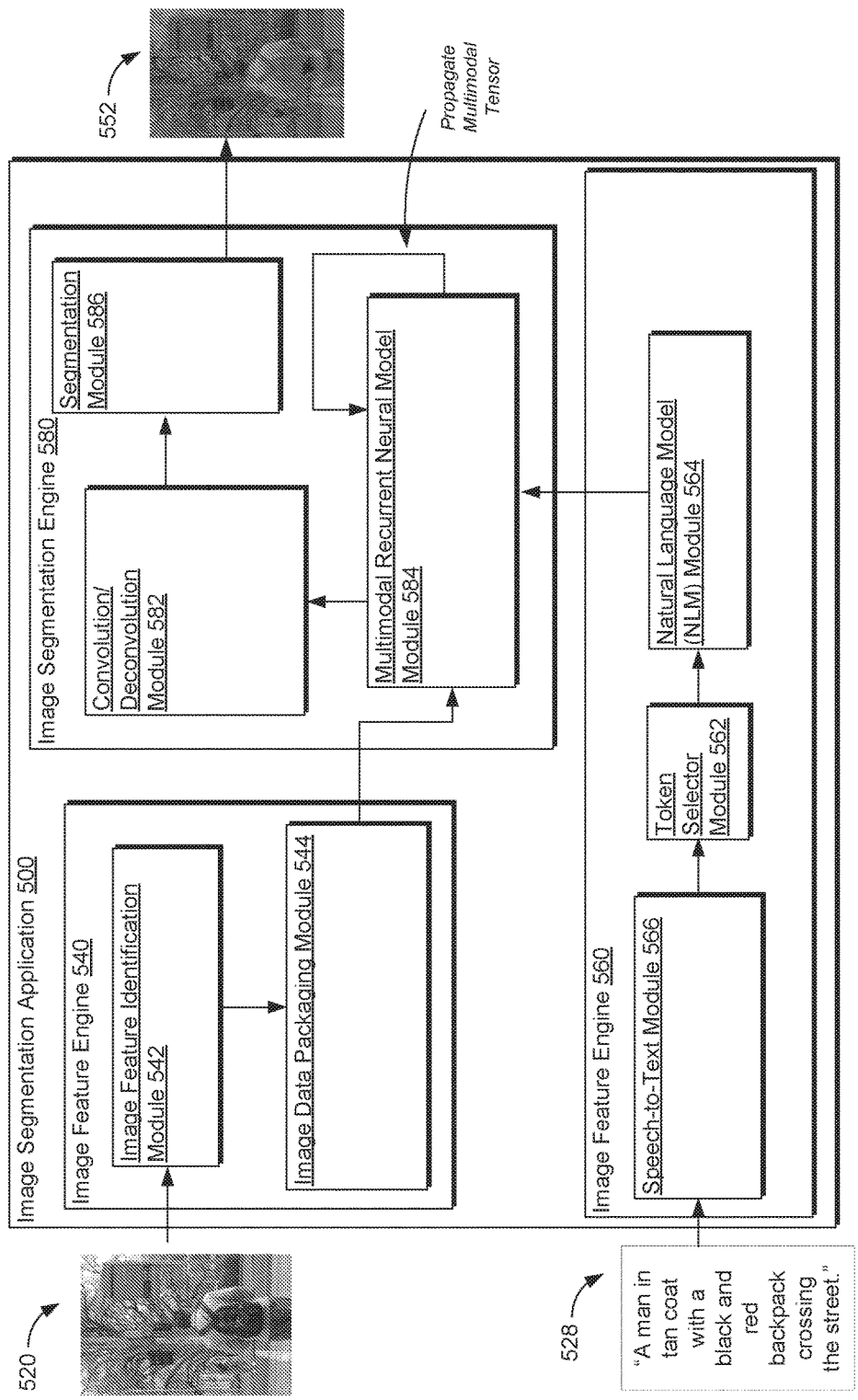
FIG. 5 illustrates an alternative embodiment of an image segmentation application (ISA) for segmenting an image based on a natural language phrase and a multimodal recurrent neural model that is consistent with the various embodiments presented herein.

Various embodiments of an ISA, such as but not limited to ISA are discussed in conjunction with at least ISA 200 of FIG. 2 and ISA 500 of FIG. 5. Thus, ISA 130 may include equivalent, similar, and/or alternative modules, engines, components, functionalities, and the like of ISA 200 and/or ISA 500. Furthermore, the various embodiments of an ISA 130 may perform, execute, or otherwise enable at least portions of the various processes discussed herein, including but not limited to processes 400 of FIG. 4A, 440 of FIG. 4B, 700 of FIG. 7A, 740 of FIG. 7B, and/or 800 of FIG. 8. ISA 130 includes an image feature engine 140, an n-gram feature engine 160, and an image segmentation engine 180. Other embodiments of an ISA may include more, fewer, and/or alternative components than ISA 130.

Briefly, in some embodiments ISA 130 is based on a recurrence of intermediate segmentation (RIS) model and is thus a RIS ISA. In other embodiments, ISA 130 is based on a multimodal recurrent neural network (mRNN) model and is thus an mRNN ISA. ISA 130 receives an input image, such as but not limited to image 120. Any of user-computing devices 102-110 may provide an image. In some embodiments, image 120 may be retrieved from image data 118 and transmitted to one or more computing devices that are hosting ISA 130.

ISA 130 also receives one or more natural language phrases. Such a phrase may be spoken by a user, manually typed by a user, or any other such means. ISA 130 structures, encodes, or otherwise represents the natural language phrase as an n-gram, such as but not limited to n-gram 128. The n-gram encodes a natural language phrase, such as but not limited to "The man in the striped shirt." The natural language phrase is in relation to the input image. Based on the n-gram, ISA 130 segments the image. ISA 130 provides the segmented image, such as but not limited to segmented image 134.

ISA 130 may include various engines, modules, components, and the like that enable various functionalities and operations of ISA 130. For instance, ISA 130 includes an image feature engine 140, an n-gram feature engine 160, and an image segmentation engine 180. As discussed in conjunction with the various embodiments, image feature engines, such as but not limited to image feature engine 140, determine, detect, and/or identify various image features of image 120 based on one or more machine-learning models and/or neural networks. Such machine-learning models and/or neural networks include, but are not otherwise limited to a trained image feature identifying models and/or convolution neural networks.

N-gram feature engines, such as but not limited to n-gram feature engine 160, receive the n-gram and determine, detect, and/or identify various features of the n-gram based on one or more machine-learning models and/or neural networks. Such machine-learning models and/or neural networks include but are not otherwise limited to a trained natural language model implemented via a recurrent neural network (RNN). In at least one embodiment, the RNN is a long short-term memory (LSTM) neural network.

Image segmentation engines, such as but not limited to image segmentation engine 180, combine the features of the image and the n-gram to generate and iteratively update a segmentation map or mask for the image. A segmentation map or mask identifies which pixels are included in the region of the image referenced by the n-gram (or natural language phrase). By employing the segmentation map, the image may be segmented to generate the outputted segmented image 132.

More specifically, image feature engine 140 may employ one or more trained convolutional neural models and/or networks to determine and/or identify abstracted features within image 120. The image feature engine 140 encodes the abstracted features of image 120 into structured data and/or a data structure. In some embodiments, the image feature data structure may be an image feature map and/or an image feature tensor. Generally, a tensor includes structured data that may be arranged in an array. A one-dimensional (1D) tensor may be, or at least may be represented and/or encoded as a vector or a 1D array. A two-dimensional (2D) tensor may be, or at least may be represented and/or encoded as a matrix or a 2D array. The various embodiments may employ tensors of virtually any dimension. Image feature engine 140 provides the image feature data structure to the image segmentation engine 180. In some embodiments, image 120 is also provided to image segmentation engine 180.

In at least one embodiment, a user may audibly speak n-gram 128 to at least one of user-computing devices 102-110. Speech-to-text services provided by one of the user-computing devices (and/or ISA 130) may transform the audible speech into a textual n-gram. As shown in FIG. 1, one such non-limiting embodiment of an n-gram may encode the natural language phrase "The man in the striped shirt." In such an embodiment, n-gram 128 includes the ordered set or sequence of natural language tokens: {"the," "man," "in," "the," "striped," "shirt"}.

N-gram 128 may be provided to n-gram feature engine 160. In various embodiments, n-gram feature engine 160 determines, detects, and/or identifies various natural language features of n-gram 160. The n-gram feature engine 160 may encode hidden features of n-gram 128 into structured data and/or a data structure. As used herein, hidden features of an n-gram may correspond to various hidden variables and/or latent variables of the n-gram. That is, the n-gram feature engine 160 may employ a latent variable model (such as but not limited to a recurrent neural model) to identify hidden and/or latent features of the n-gram. For instance, in some embodiments, n-gram feature engine 140 may employ a word embedding language model to generate a token vector for each token in the n-gram. In at least one embodiment, n-gram feature engine 160 further employs one or more trained recurrent neural models and/or networks to generate an n-gram hidden feature vector based on the token vectors and the specific sequence of tokens included in n-gram 128. The n-gram hidden feature vector may be iteratively generated. As such, the recurrent neural model and/or network may propagate (or otherwise remember) a current state of the n-gram hidden feature vector. The current state of the n-gram hidden feature vector may be used to update the state of the n-gram hidden feature vector in a subsequent iteration of the generation of the n-gram hidden feature vector. Thus, in some embodiments, the n-gram feature data structure may be an n-gram hidden feature vector and/or a token vector. N-gram feature engine 160 provides the n-gram feature data structure to the image segmentation engine 180.

Image segmentation engine 180 combines the image feature data structure and the n-gram feature data structure. The combination may be processed via one or more convolution and/or deconvolution layers of a neural model or network included in and/or employed by image segmentation engine 180. In at least one embodiment, image segmentation engine 180 may employ another recurrent neural model or network (one that is separate from the recurrent neural model employed by n-gram feature engine 160) to iteratively generate a segmentation map. As such, the recurrent neural model and/or network may propagate (or otherwise remember) a current state of the segmentation map. The current state of the segmentation map may be used to update the state of the segmentation map in a subsequent iteration of the generation of the segmentation map.

Image segmentation engine 180 may employ the segmentation map to segment image 120 based on n-gram 128. That is, segmentation engine 180 may generate and provide segmented image 132. For instance, segmented image 132 may be displayed on a display device of any user-computing device, such as but not limited to user-computing devices 102-110. Segmented image 132 may be stored in image data 118.

Note that the input image 120 includes a first man 122, a second man 124, and a third man 126, where the first man 122 is indeed "the man in the striped shirt," corresponding to the description provided via n-gram 128. In segmented image 132, a segmentation 134 segments "the man in the striped shirt."

Segmenting Images Based on a Recurrence of Intermediate Segmentation Model

FIG. 2 illustrates an exemplary embodiment of an image segmentation application (ISA) 200 for segmenting an image based on a natural language phrase and a recurrence of intermediate segmentation (RIS) model that is consistent with the various embodiments presented herein. Thus, ISA 200 may be a RIS ISA.

ISA 200 receives an input image 220 and an input n-gram 228. As shown in FIG. 2, one non-limiting example of an n-gram includes the ordered set and/or sequence of natural language tokens: {"the," "snack," "was", "looking," "very," "beautiful"}. N-gram 228 encodes the natural language phrase "The snack was looking very beautiful." The meaning of the natural language phrase encoded via n-gram 228 is in reference to image 220. N-gram 228 is employed by ISA 200 to segment image 220 and generate segmented image 232.

Similar to ISA 130 of FIG. 1, ISA 200 includes an image feature engine 240, an n-gram feature engine 260, and an image segmentation engine 280, which each may include similar modules, components, and/or functionalities to the corresponding engines of ISA 130. In some embodiments, image feature engine 240 includes an image feature identification module 242 and an image data packaging module 244. N-gram feature engine 260 may include a token selector module 262, a natural language model module 264, and a first recurrent neural model (RNM) module (i.e. RNM A module 266). Image segmentation engine 280 may include a convolution/deconvolution module 282, a segmentation module 286, and a second RNM module (i.e. RNM B module 284). Other embodiments of an ISA may include fewer or lesser engines, modules, and/or components.

The functionalities and operation of ISA 200 are iterative and will be discussed in greater detail in conjunction with at least FIGS. 3, 4A, and 4B. However, briefly image feature identification module 242 may generate an image feature map based on received input image 220 and an image feature identification model (IFIM). For instance, image feature identification module 242 may include and/or employ a trained fully convolutional neural network (FCN) to identify the features of the image. Such features may be encoded in an image feature map, discussed in conjunction with at least FIG. 3. However, briefly here, an image feature map encodes a mapping between the image features identified via the IFIM and a corresponding blocks or tiles of image pixels. The image features may be latent and/or hidden image features identified via the IFIM.

Image data packaging module 244 may generate a combination of the image feature map and spatial coordinates of tiles of the image feature map. Various embodiments of combining the image feature map and spatial coordinates of the tiles of the image feature map are discussed in conjunction with at least FIG. 3. Image data packaging module 244 may also generate an image feature data structure, such as but not limited to an image feature tensor, based on the combination and/or concatenation of the image feature map and the spatial coordinates of the tiles. As shown in FIG. 2, image data packaging module 244 may provide the image feature structures to the convolution/deconvolution module 282 of image segmentation engine 280.

Turning to the n-gram feature engine 260, the token selector module 262 may sequentially select each token of n-gram 228 and provide the selected token to natural language model module 264. Language model module 264 may include and/or employ a trained word embedding language model to generate a token data structure for each token, such as but not limited to a token vector.

Briefly, token vectors (and other token data structures discussed herein) encode semantic features of the corresponding token. Word embedding language models embed tokens in a multidimensional space. The distance between pairs of tokens in the space is indicative of semantic similarities between the pairs of tokens. Such word embedding models may be trained via the generation of semantic distributions within large semantic corpuses. One exemplary, but non-limiting embodiment may employ the "Word2Vec" natural language model. Other embodiments are not so limited, and may employ other and/or alternative word embedding language models to generate the token vector for each token.

The RNM A module 266 may generate and iteratively update an n-gram hidden feature data structure, such as but not limited to a n-gram hidden feature vector based on sequence of token vectors. The n-gram hidden feature data structure may encode, or otherwise represent various latent and/or hidden features of the n-gram that are identified via the RNM A module 266. The generation and iterative updating of the n-gram hidden feature data structure are discussed in conjunction with at least FIG. 3. However, briefly, RNM A may include and/or employ a trained RNM and/or a trained recurrent neural network (RNN) to generate and iteratively update the n-gram hidden feature vector based on the sequence of token vectors. For instance, during a first iteration, the generated n-gram hidden feature vector is based on the token vector corresponding to the first token (i.e. "the") of n-gram 228. As shown in FIG. 2, RNM A propagates (i.e. "remembers") one or more previous states (i.e. values of the vector components) of the n-gram hidden feature vector to be employed in updating subsequent states of the n-gram hidden feature vector in subsequent iterations. During a second iteration, updating the n-gram hidden feature vector is based on the initially generated n-gram hidden feature vector and the token vector corresponding to the second token (i.e. "snack") of n-gram 228. Such iterative operations are continued until the last, final, and/or terminal token of the n-gram is processed.

In at least one non-limiting embodiment, RNM A may include and/or be based on a trained first long short-term memory (LSTM) model and/or neural network. Thus, RNM A module 226 may include a first LSTM model and/or neural network (i.e. LSTM A). Other embodiments are not so constrained, and other types of RNM and/or RNN may be included in and/or employed by RNM A module 266.

After each operational iteration of RNM A module 266, the iteratively updated n-gram hidden feature vector may be provided to the convolution/deconvolution module 282 of image segmentation module 280. Image segmentation engine 280 may include one or more trained neural networks. Such neural networks may be included in and/or distributed amongst any combination of convolution/deconvolution module 282, RNM B module 284, and/or segmentation module 286. The neural networks may include various convolution (i.e. encoding) layers and/or deconvolution (i.e. decoding) layers. Convolution/deconvolution module 282 includes one or more convolution layers. In some embodiments, convolution/deconvolution module 282 includes one or more deconvolution layers. As discussed below, at least a portion of the neural networks may be RNN networks. RNM B module 284 may include another RNN (i.e. RNN B) that is separate from the RNN included in RNM A module 266. In one embodiment RNN B is a LSTM neural network (i.e. LSTM B).

Figure 3:
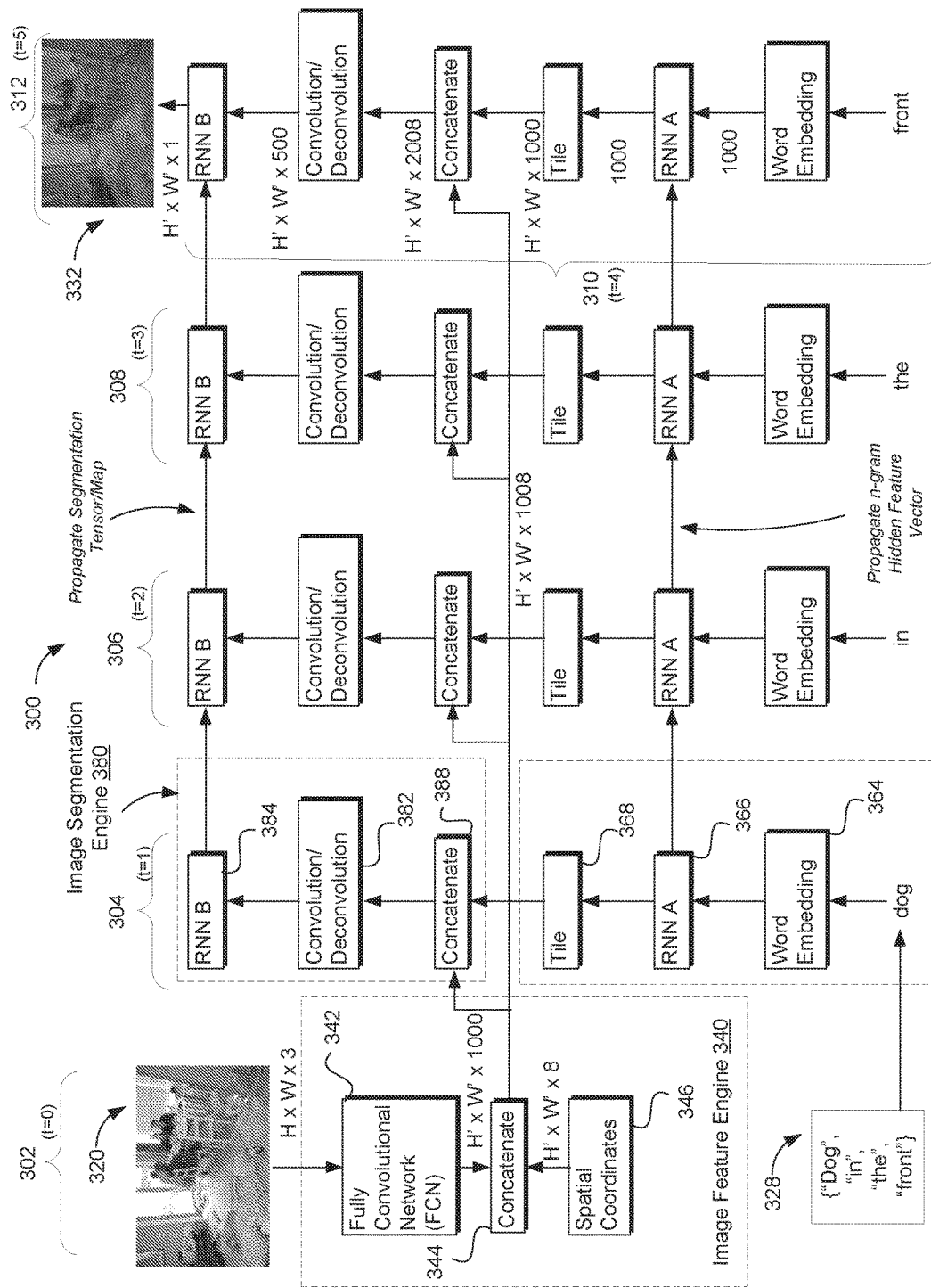
FIG. 3 schematically illustrates successive iterative steps of the recurrence of intermediate segmentation ISA of FIG. 2.

As discussed in greater detail in conjunction with at least FIG. 3, the convolution/deconvolution module 282 may combine and/or concatenate the image feature tensor with the iteratively updated n-gram hidden feature vector. Furthermore, the convolution/deconvolution module 282 may employ its one or more convolution layers and/or deconvolution layers of a neural model or neural network to encode and/or decode additional features in the structured data (i.e. the concatenated image feature tensor and the n-gram hidden feature vector).

As shown in FIG. 2, the convolution/deconvolution module 282 may provide the structured data to RNM B module 284. RNM B module 284 may employ RNN B to generate and iteratively update a segmentation tensor and/or a segmentation map based on the concatenation of the image feature tensor and the n-gram hidden feature vector. For instance, during a first iteration, the segmentation tensor and corresponding segmentation map are based on the concatenation of the image feature tensor and the first state of the n-gram hidden feature vector (i.e. the n-gram hidden feature vector based on the first token of n-gram 228: "the"). RNN B propagates the state of the segmentation tensor/map to be employed in the second iteration. That is, the during the second iteration, the segmentation tensor/map is updated based on the previous state of the segmentation tensor/map and the concatenation of the image feature tensor and the n-gram hidden feature vector based on the first and second tokens of n-gram 228 (i.e. "the" and "snack").

After the final iteration of processing the tokens of n-gram 228, the iteratively generated segmentation tensor and/or map and image 220 is provided to the segmentation module 286. The segmentation module 286 segments image 220 based on the segmentation map to generate segmented image 232. For instance, the segmentation map may be employed as a segmentation mask. A pixel-wise AND operation between corresponding pixels of the segmentation map and image 220 may be applied to generate segmented image 232.

FIG. 3 schematically illustrates successive iterative steps of the RIS ISA 200 of FIG. 2. More specifically, FIG. 3 shows 6 steps in the operation 300 of ISA 200 (i.e. steps 302-312). Steps 302-312 are ordered and indexed via integer index t. At step 302 (t=0), image 320 and n-gram 328 are received. N-gram 328 encodes the natural language phrase "Dog in the front." During iterative steps 304-310 (t=1, t=2, t=3, and t=4 respectively), a segmentation tensor is generated and iteratively updated based on image 320 and n-gram 328. The segmentation tensor encodes the segmentation map. Thus, the segmentation map may be iteratively updated at each of these steps. At step 312 (t=5), the segmentation map encoded via the segmentation tensor is employed to segment image 320 and the segmented image 332 is provided.

More particularly, image 320 may be a two-dimensional (2D) image, represented by structured data. For example, the received image may be represented and/or encoded as a three-dimensional (3D) tensor of dimensionality H×W×D, where H is the number of vertical pixels, W is the number of horizontal pixels, and D is the pixel depth. In one embodiment, each pixel may include 3 channels (i.e. RGB), and thus image 320 is encoded as an image tensor of dimensionality H×W×3.

Step 302 (t=0) schematically illustrates the operation an image feature engine 340 processing image 320. Image feature engine 340 may include similar and/or equivalent functionalities, components, modules, and the like to at least image feature engine 140 of ISA 130 and/or image feature engine 240 of ISA 200. For instance, image feature engine 340 includes one or more fully convolution neural networks (FCN 342) that operates on image 320 to generate an image feature map. FCN 342 may be included in an image feature identification module of image feature engine 340. Essentially, the FCN 342 is trained to implement an image feature identification model (IFIM) to identify abstract features of an image and generate an image feature map.

The one or more convolution kernels of FCN 342 may be such that the image feature map includes H'×W' tiles. As used herein, a "tile" of the image feature map is the basic "unit" of the image feature map. Each tile of the image feature map covers (or tiles) a rectangular region of H/H'× W/W' pixels. In one non-limiting embodiment, H'=H/32 and W'=W/32. The dimensionally depth of the feature map tiles (or number of channels) may be represented by a positive integer: $D_f$. In one embodiment, $D_f$=1000. Thus, the image feature map may be encoded in structured data, structured as a H'×W'×1000 tensor. Thus, in the embodiment shown in FIG. 3, FCN 342 generates, or otherwise outputs the image feature map, structured as a H'×W'×1000 tensor.

The spatial coordinates of each of the tiles are represented as the spatial coordinate data structure 346. In one embodiment, there are 8 spatial coordinate dimensions of each tile of the image feature map. In various embodiments, the normalized horizontal position may be characterized via 3 dimensions, the normalized vertical position characterized via another 3 dimensions, and each normalization parameters 1/W' and 1/H' is characterized via a single dimension. Accordingly, the spatial coordinates of the tiles of the image feature map may be encoded as a H'×W'×8 tensor.

Image feature engine 340 includes a concatenation (or combination) component 344 that combines (or concatenates) the image feature map and the spatial coordinates 346 to generate an image feature tensor. The concatenation component 344 may be included in an image data packaging module of image feature engine 340. As shown in FIG. 3, the dimensionality of the image feature tensor may be H'×W'×1008 (i.e. the concatenation of the H'×W'×1000 image feature map and the H'×W'×8 spatial coordinate tensor).

More generally, the image feature tensor, which is a combination of the image feature map and the spatial dimensions of its tiles, may be encoded as data structured as a H'×W'×$D_I$+8 tensor. The image feature tensor is defined over the pixels of the image. As such, the image feature tensor may be defined over $v_{i,j} \in \mathbb{R}^{D_I+8}$, where i and j are pixel indexes.

Steps 304, 306, 308, and 310 (t=1, t=2, t=3, and t=4 respectively) schematically illustrate a first iteration in the iterative operation of an n-gram feature engine 360 and an image segmentation engine 380 processing image 320. Similarly, n-gram feature engine 360 may include similar and/or equivalent functionalities, components, modules, and the like to at least n-gram feature engine 160 of ISA 130 and/or n-gram feature engine 260 of ISA 200.

More particularly, n-gram 328 is received by n-gram feature engine 360. Each iterative step 304-310 corresponds to a token (taken in sequence) of the received n-gram 328. That is, as shown in FIG. 3, step 304 corresponds to the first token of n-gram 328 (i.e. "dog"), step 306 corresponds to the second token of n-gram 328 (i.e. "in"), step 308 corresponds to the third token of n-gram 328 ("in"), and step 310 corresponds to the fourth (and terminal) token of n-gram 328 (i.e. "front").

At each of steps 304-310, a word embedding natural language model 364 of n-gram feature engine 360 is employed to generate a token vector based on the corresponding token. For instance, the word embedding language model "Word2Vec" may be employed to generate the sequence of token vectors. In other embodiments, other word embedding language models may be employed to generate the token vectors. The word embedding language model may be included in a natural language model (NLM) module of n-gram feature engine 360.

When the iteration terminates at step 310, a sequence (or ordered set) of 4 token vectors are generated via word embedding language model 364. The ordered set of token vectors may be indicated as: $S=\{w_1, w_s, \ldots w_T\}$. Thus, received n-gram 328 is encoded as $S=\{w_t\}$, where $t \in \{1,2,3,4\}$, $w_1$ is a token vector based on the token "dog", $w_2$ is a token vector based on the token "in", $w_3$ is a token vector based on the token "the", and $w_4$ is a token vector based on the token "front".

At step 304, an RNN (i.e. RNN A 366) included in n-gram feature engine 360 is employed to generate an n-gram hidden feature vector based on the token vector of the corresponding token (i.e. $w_1$). RNN A 366 may be included in RNN A module. The RNN A module may be included in the n-gram feature engine. In various embodiments, RNN A may be a LSTM neural network (i.e. LSTM A). As noted throughout, the n-gram hidden feature vector may be propagated and/or remembered by RNN A 366. At each of iterative steps 306-310, the n-gram hidden state vector is updated based on the token vector of the corresponding token and at least the previous state of the n-gram hidden vector. The n-gram hidden vector at each step may be represented as $h_t$. Accordingly, $h_t$ is the hidden state of RNN A at the t+1 iteration. The dimensionality of $h_t$ may be indicated as D. In one non-limiting embodiment, $D_s$=1000.

At step 306, the n-gram hidden feature vector ($h_2$) is updated based on $w_2$ and $h_1$. Similarly, at step 308, the n-gram hidden feature vector ($h_3$) is updated based on $w_3$ and $h_2$. In other embodiments, RNN A may have a longer memory, i.e. at step 310, the n-gram hidden feature vector ($h_4$) is updated based on $w_4$ and $h_3$, $h_2$, and/or $h_1$.

In embodiments where RNN A is a LSTM (i.e. LSTM A neural network), the input gates may be represented as the vector i, the forget gates may be represented as the vector f, the output gates are represented as the vector o, and the memory gates are represented as the vector g. The dimensionality of the gates of LSTM A is indicated as n. Furthermore, the memory states, at iteration t, are represented by the vector $c_t$. In such an embodiment, the iterative operation LSTM A (at iteration t) may include the following operations:

$$LSTM: (w_t, h_{t-1}, c_{t-1}) \rightarrow (h_t, c_t)$$

$$\begin{pmatrix} i \\ f \\ o \\ g \end{pmatrix} = \begin{pmatrix} sigm \\ sigm \\ sigm \\ tanh \end{pmatrix} M_{4n,D_S+n} \begin{pmatrix} w_t \\ h_{t-1} \end{pmatrix}$$

$$c_t = f \odot c_{t-1} + i \odot g$$

$$h_t = o \odot \tanh(c_t)$$

Sigm indicates a sigmoid function. A tiling component 368 may tile the n-gram hidden feature vector (i.e. the hidden state of LSTM A: $h_t$) to generate a data structure (e.g. a tensor) with the dimensionality of H'×W'×$D_S$. $M_{4n,D_S+n}$ is a matrix/tensor operator that encodes one or more kernels of LSTM A. As noted above, in some embodiments, $D_S$=1000. Thus, as shown in FIG. 3, the n-gram hidden feature vector may be tiled and encoded, via tiling component 368, as a H'×W'×1000 tensor.

A concatenation component 388 of image segmentation engine 360 may combine the image feature tensor (encoded in and/or structured as a H'×W'×$D_I$+8 tensor) and the n-gram hidden feature vector (encoded in and/or structured as a H'×W'×$D_S$ tensor). Accordingly, concatenation module 388 may generate a H'×W'×$D_S$+$D_I$+8 tensor. As shown in FIG. 3, in at least one embodiment, the tensor is a H'×W'×2008 dimensional tensor. The concatenation component 388 may be included in a convolution/deconvolution module of image segmentation engine 380.

One or more convolution and/or deconvolution neural network layers 382 included in such a convolution/deconvolution module may provide further encodings and/or decodings of the H'×W'×$D_S$+$D_I$+8 tensor. As shown in FIG. 3, in at least one embodiment, the convolution/deconvolution layers generate an encoding of dimensionality H'×W'×500 based on the H'×W'×$D_S$+$D_I$+8 tensor. The H'×W'×500 tensor is provided as input to a second RNN (RNN B 384) included in image segmentation engine 360. RNN B 384 may be included in a RNM B module of image segmentation engine 360.

RNN B 384 may generate and iteratively update a segmentation tensor based on the inputted H'×W'×500 tensor. At each iterative step (steps 304-310 indexed via index t), the H'×W'×500 tensor is based on each of the image feature tensor ($v_{ij}$) and the n-gram hidden feature tensor ($h_t$). Thus, at each iterative step 304-310, the segmentation tensor is based on the image feature tensor and the n-gram hidden feature tensor corresponding to the iterative step.

One or more convolution layers and/or deconvolution layers within RNN B 384 may generate additional encoding and/or decodings such that the segmentation tensor is a tensor of dimensionality: H×W×1. Thus, there is a one-to-one correspondence between "pixels" of the segmentation tensor and the pixels of input image 320. In such embodiments, the segmentation tensor is a segmentation map. Each successively updated segmentation tensor may be represented as $R_{i,j,t} \in \mathbb{R}^{W \times H}$, where i and j are pixel indexes and t is the index for the iteration. In at least one embodiment, the segmentation tensor is a binary tensor, i.e. the value at each pixel is either '0' or '1'. In such embodiments, the segmentation map may be a segmentation mask.

Similar to RNN A 366, during each iterative operation of RNN B 384, the state of the segmentation tensor may be propagated (or remembered) via memory states of RNN B 384. Thus, updated segmentation tensor ($R_{i,j,t}$) at iteration t may be based on at least the state of the segmentation tensor ($R_{i,j,t-1}$) at the previous t−1 iteration, and well as the image feature tensor ($v_{i,j}$) and the n-gram hidden feature tensor ($h_t$) of the current iteration (t).

In at least one embodiment, RNN B 384 may update the segmentation tensor via the following operation:

$$R_{i,j,t} = W_{hidden} R_{i,j,t-1} + W_{input} \begin{pmatrix} h_t \\ v_{i,j} \end{pmatrix},$$

$W_{hidden}$ and $W_{input}$ are weights of the trained RNN B 384. At the final step 312 (t=5), the segmentation map (as encoded in the segmentation tensor) is employed as a pixel-wise mask to segment image 320. A pixel-wise AND logical operation is performed by a segmentation module of image segmentation engine 380 to generate segmented image 332. Segmented image 332 may be provided to a user. Segmented image 332 may be similarly encoded as input image 320, i.e. as a H×W×3 tensor.

Processes 400 and 440 of FIGS. 4A and 4B respectively will now be discussed. Briefly, processes 400 and 440 may be employed by an image segmentation application (ISA), such as but not limited to ISA 130 of FIG. 1 and/or ISA 200 of FIG. 2, to automatically segment images based on natural language phrases. Furthermore, various aspects of operations included in processes 400 and 440 are schematically illustrated in and discussed in conjunction with FIG. 3.

FIG. 4A illustrates one embodiment of a process flow for segmenting an image based on a natural language phrase and a recurrence of intermediate segmentation model that is consistent with the various embodiments presented herein. Process 400 begins, after a start block, at block 402 where at least one of a first recurrent neural model (RNM) (RNM A) and a second RNM (RNM B) are iteratively generated. Various embodiments for iterative generating and RNM are discussed in conjunction with at least process 800 of FIG. 8. However, briefly here, an RNM may be trained to automatically identify features within data structures, such as tensors and vectors, of high dimensionality. As discussed below, the RNMs may be trained to identify features, such as hidden features and abstract features, within n-grams, images, and combinations thereof.

An RNM may be implemented on and/or enabled by a recurrent neural network (RNN). Iteratively generating an RNM may include training the RNM. Thus, in some embodiments, at least one RNM and/or an RNN is trained at block 402 as discussed in conjunction with process 800. For instance, the image may be received by an ISA. At block 404, and image is received.

At block 406, an image feature map is generated based on the received image and an image feature identification model (IFIM). For instance, one or more FCNs included in an image feature engine of the ISA may generate the image feature map. The image feature map may be encoded in an image data structure. Thus, at block 406, an image data structure may be generated that encodes a mapping between identified image features and corresponding tiles (or blocks) of pixels of the image feature map. At block 408, an image feature tensor is generated based on a combination and/or a concatenation of the image feature map and the spatial coordinates of the tiles of the image feature tensor. An image data packing module of the image feature engine may package and/or encode the image feature tensor. Step 302 of FIG. 3 schematically illustrates the generation of an image feature tensor. The image feature tensor may be encoded in an image data structure. Thus, at block 408, the image data structure may be generated and/or updated.

At block 410, an n-gram is received. An n-gram feature engine of the ISA may receive the n-gram. The n-gram may reference a region of the image. For instance, the referenced region may depict an object that is a subject of the n-gram. At block 412, an n-gram hidden feature vector is generated and iteratively updated based on the n-gram and the trained RNM A. Various embodiments for generating and iteratively updating an n-gram hidden feature vector are discussed in conjunction with process 440 of FIG. 4B. However, briefly here, an RNN module of the n-gram feature engine may employ trained RNM A to generate and iteratively update the n-gram hidden feature vector.

At block 414, a segmentation tensor is generated and iteratively updated based on a combination of the image feature tensor and the n-gram hidden feature vector and a second RNM (i.e. RNM B). Various embodiments for generating and iteratively updating the segmentation tensor are discussed in conjunction with process 440. However, briefly, an image segmentation engine of the ISA may include and/or employ RNM B to generate and iteratively update the segmentation tensor. The segmentation tensor may be encoded in a segmentation data structure. Thus, at block 414, a segmentation data structure is generated and iteratively updated. The segmentation tensor encodes the segmentation map or mask. The segmentation map or mask identifies each pixel on the image that is included in the region of the image that is referenced via the n-gram.

At block 416, a segmentation map or mask is generated based on the segmentation tensor and one or more convolution/deconvolution models. At block 418, the segmented image is generated based on the image and the segmentation map. For instance, a segmentation module of the map segmentation engine may employ the segmentation map as a mask and perform a pixel-wise AND logical operation on the image to segment the image and generate the segmented image. At block 420, the segmented image is provided 420. For instance, the segmented image may be provided to one or more user computing devices and/or stored in storage. Process 400 terminates and/or returns a calling process.

FIG. 4B illustrates one embodiment of a process flow for employing ISA 200 of FIG. 2 (and/or ISA 130 of FIG. 1) to iteratively generate a segmentation tensor based on a natural language phrase and a recurrence of intermediate segmentation model. Process 440 begins, after a start block at block 442, where a next token in the n-gram is sequentially selected. Thus, during the first call of process 440, the first token of the n-gram is selected. For instance, a token selector module of an ISA may sequentially select each of the tokens, from the first token to the last (or terminal) token.

At block 444, a token vector is generated based on the selected token and one or more natural language models. For instance, a word embedding language model may be employed to generate the token vector. Steps 304-310 of FIG. 3 illustrate word embedding language model 364 generating a sequence of token vectors. In various embodiments, a token vector is encoded in a token data structure. Thus, upon the final call of block 444, an ordered set or sequence of token data structures is generated via successive calls of block 444. Each of the token data structures encodes and/or is indicative of semantic features corresponding to the selected token.

During the first call of block 446, an n-gram hidden feature vector is generated and/or updated based on the token vector and a first RNM (i.e. RNM A). For subsequent calls of block 446, the n-gram hidden feature vector is updated based on the current state of the n-gram hidden feature vector, RNM A, and a subsequent token vector based on the next token. In at least one embodiment, RNM A is implemented via a LSTM neural network. For instance, steps 304-310 of FIG. 3 illustrate RNN A 366 generating and iteratively updating the n-gram feature vector.

At block 448, the generated/updated n-gram hidden feature vector is propagated (i.e. stored and/or remembered). As discussed throughout, internal (or hidden) nodes (or gates) of RNN A may propagate the n-gram hidden feature vector. As shown in FIG. 3, the n-gram hidden feature vector is iteratively propagated from step 304 to each subsequent step, up to step 310. In some embodiments, a current state of the n-gram hidden feature vector is propagated so that the current state of the n-gram hidden feature vector may be employed to update the n-gram hidden feature vector in subsequent calls to block 446.

At block 450, a combination (or concatenation) of the image feature tensor and the updated n-gram hidden feature vector may be generated. In some embodiments, the n-gram hidden feature vector may be tiled based on the dimensions of the image feature tensor. Steps 304-310 of FIG. 3 show tiling component 368 tiling the n-gram hidden feature vector based on the dimensions of the image feature tensor. Once tiled n-gram hidden feature vector is tiled, the image feature tensor and the n-gram hidden feature vector may be combined. Steps 304-310 schematically illustrate concatenation module 388 combining the image feature tensor and the n-gram hidden feature vector. At block 452, the combination of the image feature tensor may be convolved and/or deconvolved via various convolution and deconvolution neural network layers. Steps 304-310 schematically illustrate concatenation module 382 convolving/deconvolving (encoding/decoding) combinations of the image feature tensor and the n-gram hidden feature vector.

During the first call of block 454, a segmentation tensor is generated and/or updated based on the combination of the image feature tensor and the updated n-gram hidden feature vector and a second RNM (i.e. RNM B). For subsequent calls of block 454, the segmentation tensor is updated based on the current state of the segmentation tensor, RNM B, and a subsequent combination of the image feature tensor and a subsequent n-gram hidden feature vector based on the next token. In at least one embodiment, RNM B is implemented via a LSTM neural network.

At block 456, the generated/updated segmentation tensor is propagated. As discussed throughout, internal (or hidden) nodes (or gates) of RNN B may propagate the segmentation tensor. As shown in FIG. 3, the segmentation tensor is iteratively propagated from step 304 to each subsequent step, up to step 310. In some embodiments, a current state of the segmentation tensor is propagated so that the current state of the segmentation tensor may be employed to update the segmentation tensor in subsequent calls to block 454.

At decision block 458, it is determined whether another token in the n-gram is to be selected. If the currently selected token is the last or terminal token in the n-gram, process 440 flows to block 460. Otherwise, process 440 returns to block 442 to select the next token in the n-gram. At block 460, the updated segmentation tensor is provided. Process 440 may terminate and/or return a calling process.

Segmenting Images Based on a Multimodal Recurrent Neural Model

FIG. 5 illustrates an alternative embodiment of an image segmentation application (ISA) 500 for segmenting an image based on a natural language phrase and a multimodal recurrent neural model (mRNM) that is consistent with the various embodiments presented herein. Thus, ISA 500 may be a mRNM ISA. The mRNM may be a convolutional multimodal LSTM (mLSTM). A mLSTM enables word-visual interaction between the image and the n-gram. Such interactions generate multimodal features at every iterative step.

ISA 500 may include similar features, modules, components, operations, and functionalities as ISA 130 of FIG. 1 and ISA 200 of FIG. 2. For instance, ISA 500 includes an image feature engine 540, an n-gram feature engine 560, and an image segmentation engine 580, which each may include similar modules, components, and/or functionalities to the corresponding engines of ISA 130 and ISA 200. In some embodiments, image feature engine 540 includes an image feature identification module 542 and an image data packaging module 544. N-gram feature engine 560 may include a speech-to-text module 566, a token selector module 562, and a natural language model (NLM) module 564. Image segmentation engine 280 may include a convolution/deconvolution module 582, a segmentation module 586, and an mRNM module 584. Other embodiments of an ISA may include fewer or lesser engines, modules, and/or components. Some of the functionalities of such components, modules, engines, and the like may be similar to those discussed in conjunction with FIGS. 2-4B. At least a portion of the differences of the modules, components, functionalities, and operations are discussed below. It should be noted that any such differences discussed below may be incorporated into ISA 130 and/or ISA 200.

ISA 500 receives input image 520 and natural language phrase 528. Image feature identification module 542 generates an image feature map based on image 520 and one or more fully convolutional neural networks (FCNs) trained to implement an image feature identification model (IFIM). The image data packaging module 544 combines the image feature map with the spatial coordinates of the image feature map to generate an image feature map tensor.

In at least one embodiment, phrase 528 may be spoken and/or audible natural language phrase (or sentence). That is, a user may audible speak natural language phrase 528. The speech-to-text module 566 may transform the spoken phrase 528 into a text-based n-gram. More specifically, speech-to-text module 566 may generate a textual n-gram (i.e. an n-gram that includes tokens encoded in textual data) based on spoken phrase 528 and a speech-to-text model. Upon sequential selection of each token, via token selector module 562, NLM module 564 generates a token vector for each selected token. For instance, NLM module 564 may employ the "Word2Vec" method, or other word embedding model, to generate the token vectors.

mRNM module 584 may iteratively combine the image feature tensor and a token vector. A mRNN included in and/or employed by mRNM module 584 may generate and iteratively update a multimodal tensor based on the combination of the image feature tensor and the token vector. The mRNN may be a convolutional multimodal LSTM. The multimodal tensor may be propagated from one iteration to the next.

Convolution/Deconvolution module 582 may employ one or more convolutional and/or deconvolutional layers of the mRNN to further encode/decode the multimodal tensor. A segmentation map may be generated based on the multimodal tensor. Segmentation module 586 may generate the segmented image based on the segmentation map.

Figure 6:
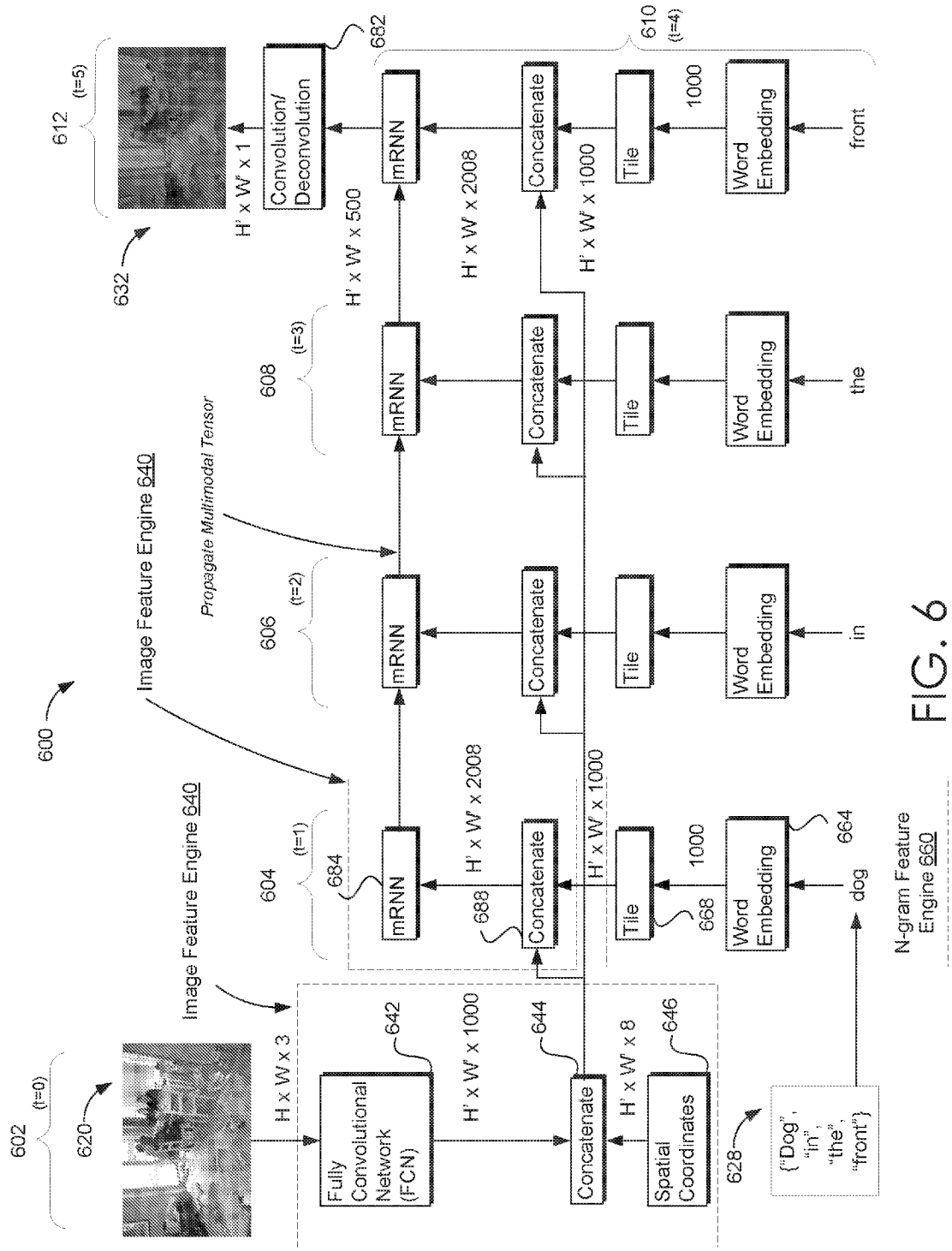
FIG. 6 schematically illustrates successive iterative steps of the multimodal recurrent neural ISA of FIG. 5.

FIG. 6 schematically illustrates successive iterative steps of the multimodal recurrent neural ISA of FIG. 5. More specifically, FIG. 6 shows 6 steps in the operation 600 of ISA 500 (i.e. steps 602-612). Steps 602-612 are ordered and indexed via integer index t. At step 602 (t=0), image 620 and n-gram 628 are received. N-gram 628 encodes the natural language phrase "Dog in the front." During iterative steps 604-610 (t=1, t=2, t=3, and t=4 respectively), a multimodal tensor is generated and iteratively updated based on image 620 and n-gram 628. At step 612 (t=5), the multimodal tensor is employed to segment image 620 and the segmented image 632 is provided.

The operations/functionalities of various engines, components, modules, and the like are schematically shown in FIG. 6. Such engines, components, modules, operations, and functionalities may be similar to the operations shown in FIG. 3. For instance, the operations of image feature engine 640 may be similar to the operations of image feature engine 340 of FIG. 3. That is, the operations of FCN 642 and concatenation component 644 on input image 620 and spatial coordinates 646 may be similar to that already discussed.

Various features of n-gram feature engine 660 may be similar to n-gram feature engine 330 of FIG. 3. For instance, word embedding language model 664 may sequentially generate token vectors based on the sequence of tokens in n-gram 628. Thus, received n-gram 628 is encoded as S={$w_t$}, where t∈{1,2,3,4}, $w_1$ is a token vector based on the token "dog", $w_2$ is a token vector based on the token "in", $w_3$ is a token vector based on the token "the", and $w_4$ is a token vector based on the token "front". In a non-limiting embodiment, the "Word2Vec" word embedding natural language model is employed to generate the token vectors.

A tiling component 668 may tile the token vectors (which may be of dimensionality of 1000), to cover the dimensionality of the image feature map. Concatenation component 688 may concatenate or combine the tiled token vectors and the image feature map.

mRNN 684 processes the combination of the token vectors and the image feature tensor. In various embodiments, mRNN 684 is a convolutional multimodal LSTM (mLSTM) neural network that iterative operates on the combination of the token vectors and the image feature tensor to generate a segmentation map. The hidden states of the convolutional mLSTM are structured as a multimodal tensor. The multimodal tensor is propagated from one iteration to the next. Furthermore, the current state of multimodal tensor is employed to update the multimodal tensor in subsequent iterations.

More specifically, the iterative operation of the convolutional mLSTM may include the following operation:

$$mLSTM: \left( \begin{bmatrix} w_t \\ v_{i,j} \end{bmatrix}, h_{t-1}, c_{t-1} \right) \to (h_t, c_t)$$

The tensor $$\begin{bmatrix} w_t \\ v_{i,j} \end{bmatrix}$$

encodes the combination of the tiled token vector (at iteration t) and the image feature tensor. The matrix/tensor operator (M) encoding the kernel of the mLSTM may be of dimensionality of $(4n \times (D_S \times D_f + 8 + n))$.

In some embodiments, the matrix/tensor operator is configured to ignore the image feature tensor and encode only semantic information encoded in the token vectors. In other embodiments, the matrix/tensor operator is configured to ignore the token vectors.

One or more convolution and/or deconvolution layers of mRNN 684 may be further employed to further encode/decode the multimodal tensor. The segmentation map is generated based on the multimodal tensor. Segmented image 632 is generated based on the segmentation map.

Processes 700 and 740 of FIGS. 7A and 7B respectively will now be discussed. Briefly, processes 700 may be employed by an image segmentation application (ISA), such as but not limited to ISA 130 of FIG. 1 and/or ISA 500 of FIG. 5, to automatically segment images based on natural language phrases. Furthermore, various aspects of operations included in processes 700 and 740 are schematically illustrated in and discussed in conjunction with FIG. 6.

Figure 7A:
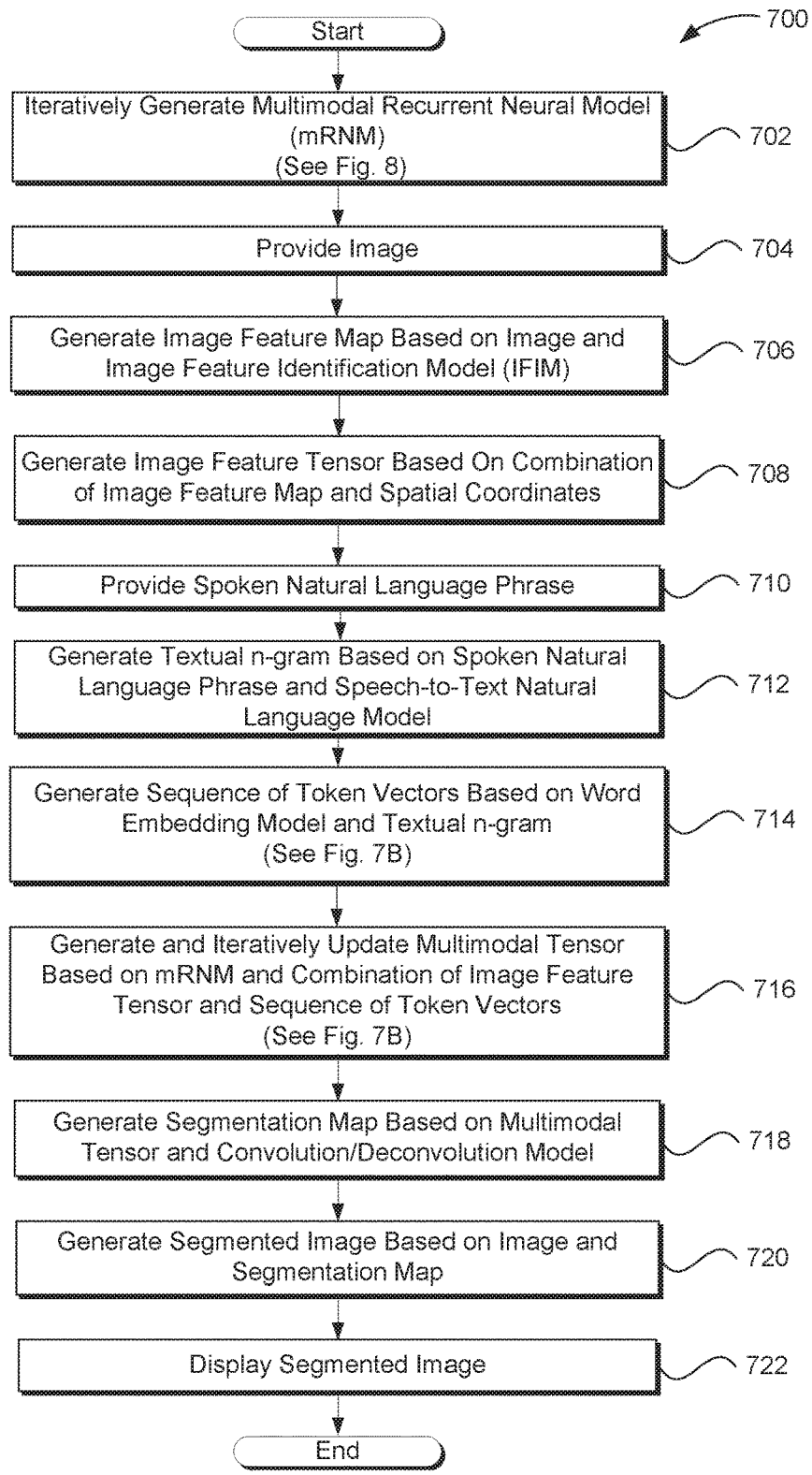
FIG. 7A illustrates one embodiment of a process flow for segmenting an image based on a natural language phrase and a multimodal recurrent neural model that is consistent with the various embodiments presented herein.

FIG. 7A illustrates one embodiment of a process flow for segmenting an image based on a natural language phrase and a multimodal recurrent neural model that is consistent with the various embodiments presented herein. Process 700 begins, after a start block, where a multimodal recurrent neural model (mRNM) is iteratively generated. Various embodiments for iteratively generating an mRNM are discussed in conjunction with at least process 800 of FIG. 8. However, briefly here, iteratively generating an mRNM may include training one or more multimodal recurrent neural networks (mRNN).

At block 704, an image is provided. At block 706, an image feature map based on the image and an image feature identification model (IFIM) is generated. The image feature map may be encoded in an image data structure. Thus, at block 706, an image data structure may be generated that encodes a mapping between identified image features and corresponding tiles (or blocks) of pixels of the image feature map. At block 708, an image feature tensor is based on a combination of the image feature maps and the spatial coordinates of tiles of the image feature map. The image feature tensor may be encoded in an image data structure. Thus, at block 708, the image data structure may be generated and/or updated.

At block 710, a user may provide a spoken natural language phrase. The spoken natural language phrase may reference a region of the image. For instance, the referenced region may depict an object that is a subject of the spoken n-gram. At block 712, a text-based (or a textual) n-gram is generated based on the spoken natural language phrase and a speech-to-text model. For instance, speech-to-text module may be employed to transform the spoken phrase into textual tokens. At block 714, a sequence of token vectors are generated based on a word embedding model and the textual n-gram. Various embodiments for generating a sequence of token vectors are discussed in conjunction with at least process 740 of FIG. 7B. For instance, the "Word2Vec" word embedding language model may be employed to generate each of the token vectors.

At block 716, a multimodal tensor is generated and iteratively updated based on the trained mRNM. Various embodiments for generating and iteratively updating a multimodal tensor are discussed in conjunction with at least process 740. However, briefly here, the multimodal tensor may be generated and iteratively updated based on a combination of the image feature tensor and the sequence of token vectors. The multimodal tensor may be encoded in a segmentation data structure. Thus, at block 716, a segmentation data structure is generated and iteratively updated. The multimodal tensor encodes the segmentation map or mask. The segmentation map or mask identifies each pixel on the image that is included in the region of the image that is references via the n-gram.

At block 718, a segmentation map may be generated based on the multimodal tensor and one or more convolution/deconvolution models. At block 720, the segmented image is generated based on the image and the segmentation map. At block 722, the segmented image may be displayed on a display device of a user-computing device. Process 700 may terminate and/or return a calling process.

Figure 7B:
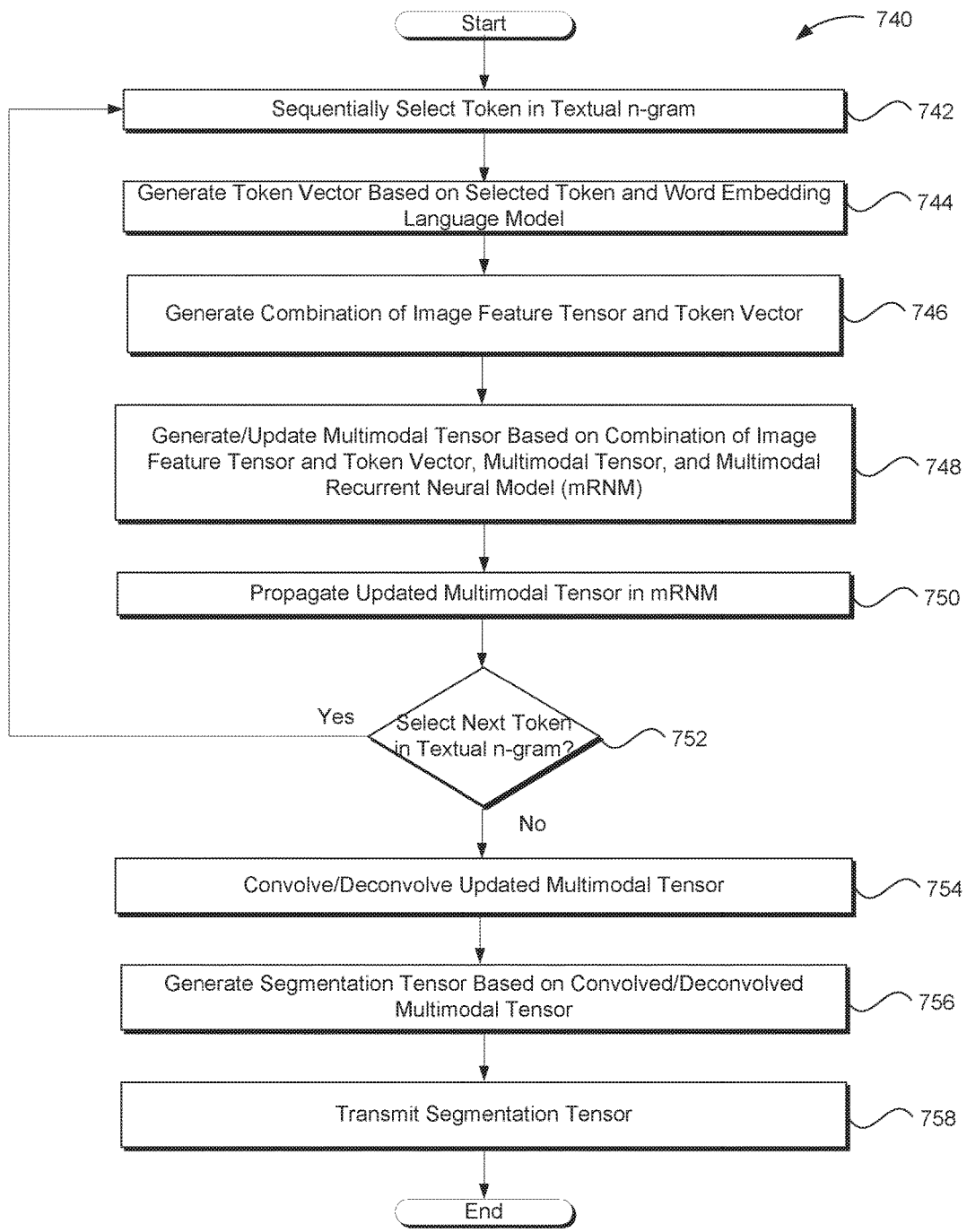
FIG. 7B illustrates one embodiment of a process flow for employing the ISA of FIG. 5 to iteratively generate a segmentation tensor based on a natural language phrase and a multimodal recurrent neural model.

FIG. 7B illustrates one embodiment of a process flow for employing the ISA 500 of FIG. 5 (and/or ISA 130 of FIG. 1) to iteratively generate a segmentation tensor based on a natural language phrase and a multimodal recurrent neural model. At block 742, the tokens in the textual n-gram are sequentially selected. At block 744, a token vector is generated based on the selected token and a word embedding language model. In various embodiments, a token vector is encoded in a token data structure. Thus, upon the final (or terminal) call of block 744, an ordered set or sequence of token data structures is generated via successive calls of block 744. Each of the token data structures encodes and/or is indicative of semantic features corresponding to the selected token. At block 746, a combination (or concatenation) of the image feature tensor and the token vector is generated.

At block 748, a multimodal tensor is generated or updated based on the combination of the image feature tensor and the token vector. The multimodal tensor may be updated further based on a previous state of the multimodal tensor and the trained mRNM. At block 750, the updated multimodal tensor is propagated within the mRNM.

At decision block 752, it is determined whether another token in the n-gram is to be selected. If the currently selected token is the last or terminal token in the n-gram, process 740 flows to block 752. Otherwise, process 740 returns to block 742 to select the next token in the n-gram. At block 754, one or more convolution/deconvolution layers of the mRNN are employed to further encode/encode the multimodal tensor. At block 756, a segmentation tensor is generated based on the multimodal tensor. At block 758, the segmentation tensor may be transmitted. Process 740 may terminate and/or return a calling process.

Training Recurrent Neural Models and Multimodal Recurrent Neural Models

Figure 8:
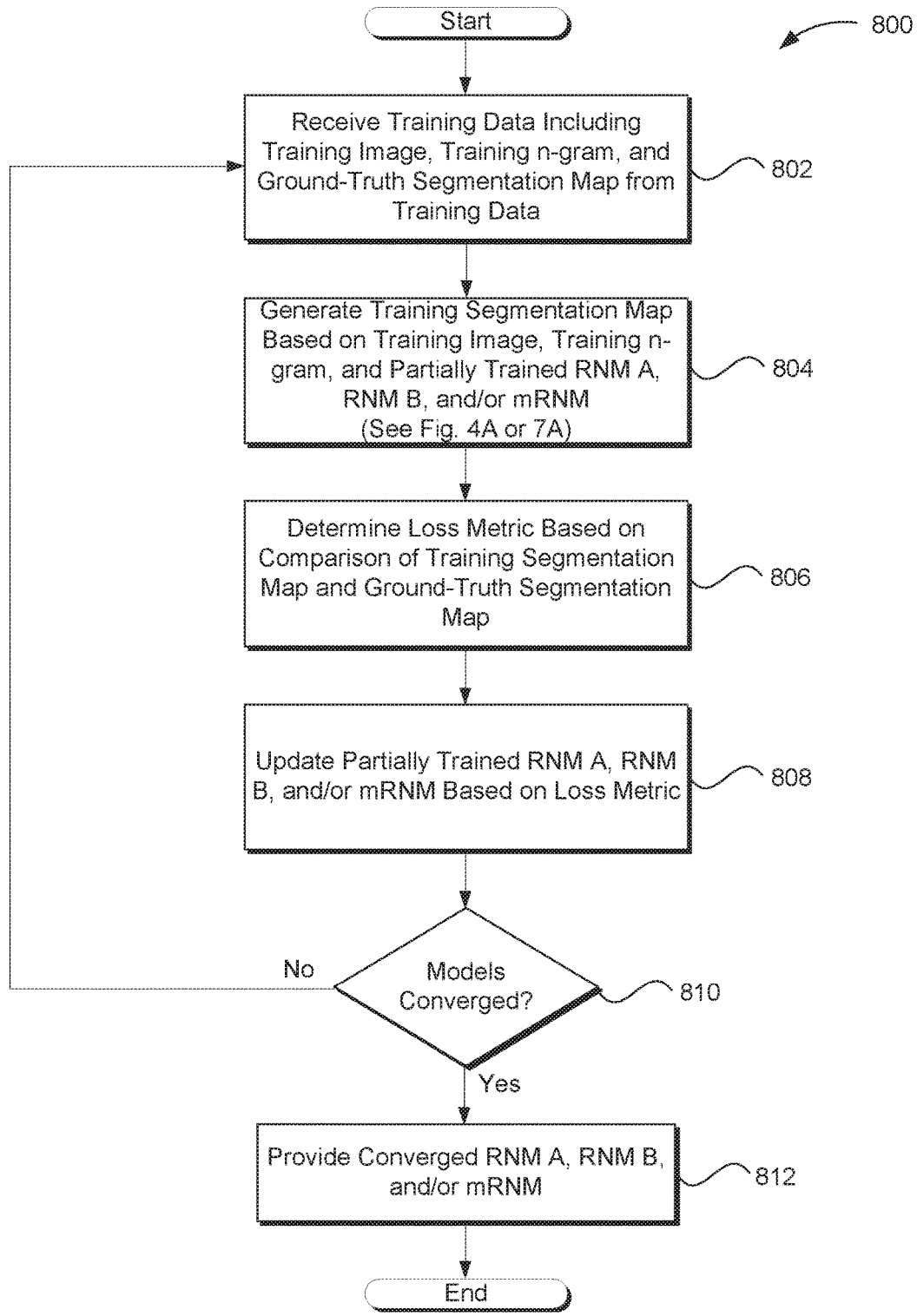
FIG. 8 illustrates one embodiment of a process flow for iteratively generating recurrent neural models and multimodal recurrent neural models that is consistent with the various embodiments presented herein.

FIG. 8 illustrates one embodiment of a process flow for iteratively generating recurrent neural models and multimodal recurrent neural models that is consistent with the various embodiments presented herein. Process 800 begins, after a start block, at block 802 where training data is received. For instance, the training data may be stored in training data 118 of FIG. 1. The training data may include a training image, a training n-gram, and a ground-truth segmentation map.

At block 804, a training segmentation map is generated based on the training image and the training n-gram. Various embodiments for generating such a segmentation map are discussed throughout, including in conjunction with at least process 400 of FIG. 4A and process 700 of FIG. 7A. However briefly, a training segmentation map may be based on a partially trained RNM A, RNM B, and/or a mRNM.

At block 806, a loss metric is determined based on a comparison of the training segmentation map and the ground-truth segmentation map. The training segmentation map may be indicated as $R_{i,j}$ and the ground-truth segmentation map may be indicated as $\hat{R}_{i,j}$. In some embodiments, the loss metric (L) may be determined as follows:

$$L = \frac{1}{WH}\sum_{i=1}^{W}\sum_{j=1}^{H}\left(\hat{R}_{i,j}*(-\log(\sigma(R_{i,j}))) + \left(1-\hat{R}_{i,j}\right)*(-\log(1-\sigma(R_{i,j})))\right)$$

In other embodiments, the loss metric may be determined as follows:

$$L = \frac{1}{W'H'}\sum_{i=1}^{W'}\sum_{j=1}^{H'}\left(\hat{R}_{i,j}*(-\log(\sigma(R_{i,j}))) + \left(1-\hat{R}_{i,j}\right)*(-\log(1-\sigma(R_{i,j})))\right)$$

At block 808, at least one of the partially trained RNM A, RNM B, and/or mRNM is updated based on the loss metric. Standard back-propagation may be employed when updating any of the various RNNs.

At decision block 810, it is determined whether one or more of the models have converged. If the models have converged, process 800 flows to block 812. Otherwise, process 800 returns to block 802 to received additionally training data and continue the training process. At block 812, at least one of the converged (or trained) RNM A, RNM B, and/or mRNM is provided. Process 800 may terminate and/or return a calling process.

Illustrative Computing Device

Figure 9:
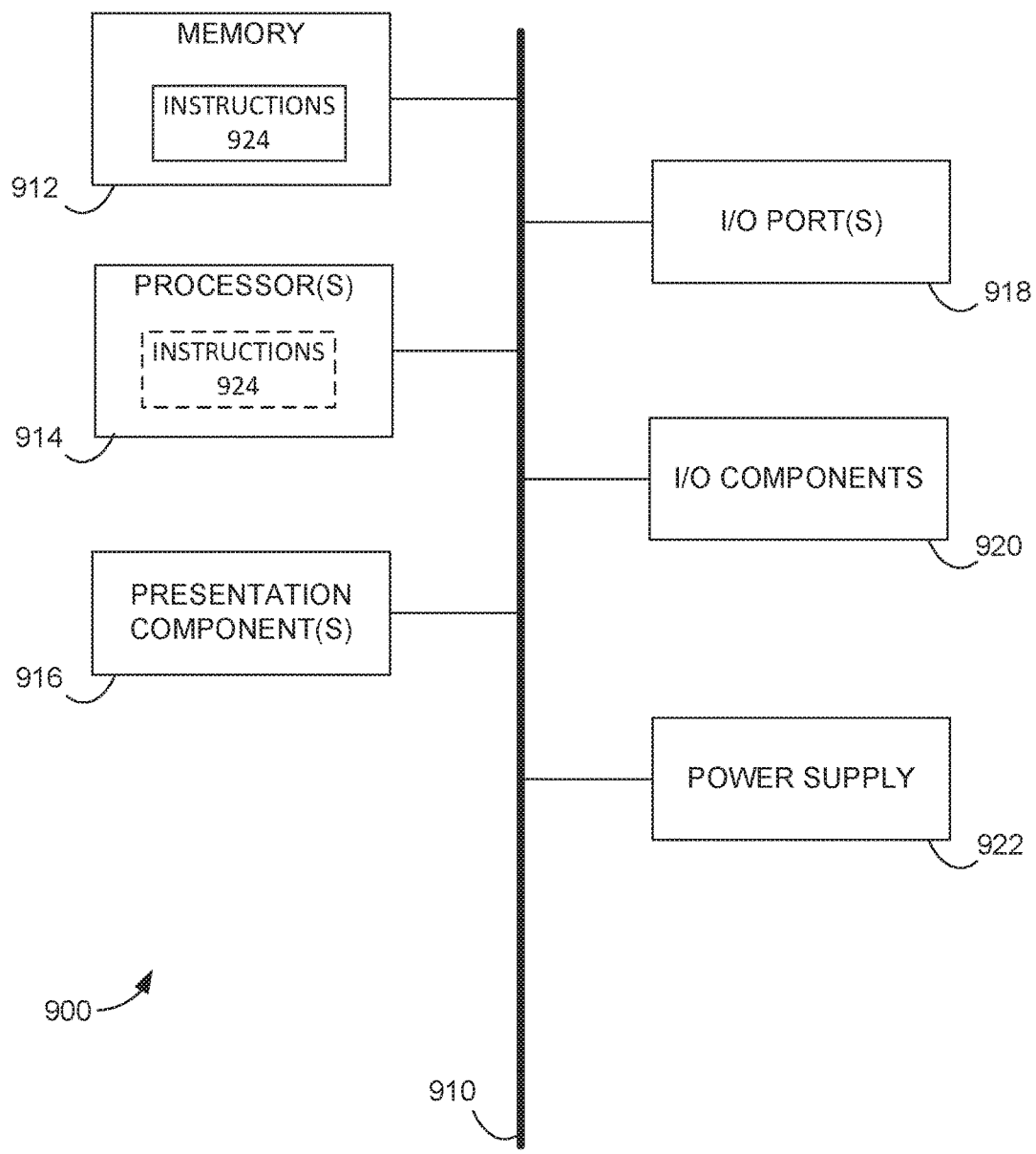
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for segmenting an image, which, when executed by a processor of a computing device cause the computing device to perform actions comprising:
   receiving a phrase that references a first region of the image, wherein the phrase includes a set of tokens;
   generating a plurality of token data elements based on the set of tokens, wherein each of the plurality of token data elements indicates a semantic feature of a corresponding token of the set of tokens;
   generating a plurality of iterative updates of a segmentation map of the image based on an order of the set of tokens, wherein each of a plurality of iterative updates of the segmentation map is based on the semantic feature indicated by the corresponding token data element; and
   segmenting the first region of the image based on the iteratively updated segmentation map.

2. The non-transitory computer-readable storage medium of claim 1, wherein the actions further comprise: generating an image map that represents a correspondence between each of a plurality of image features and corresponding portion of a plurality of pixels, wherein the image includes the plurality of pixels.

3. The non-transitory computer-readable storage medium of claim 1, wherein the actions further comprise: generating a segmented image based on the image and the segmentation map.

4. The non-transitory computer-readable storage medium of claim 1, wherein the segmentation map represents whether each of the plurality of pixels is included in the first region of the image.

5. The non-transitory computer-readable storage medium of claim 1, wherein the plurality of iterative updates of the segmentation map is further based on a previous version of the segmentation map and a combination of the image map and one of the corresponding token data elements that is based on the order of the set of tokens.

6. The non-transitory computer-readable storage medium of claim 1, wherein the actions further comprise:
   iteratively updating an n-gram data element that encodes semantic features of the order of the set of tokens, wherein each of a plurality of iterative updates of the n-gram data element is based on a previous version of the n-gram data element and one of the token data elements based on the order of the set of tokens; and
   iteratively updating the segmentation map, wherein each of the plurality of iterative updates of the segmentation map is further based on a combination of the image map and an updated n-gram data element corresponding to the order of the set of tokens.

7. The non-transitory computer-readable storage medium of claim 6, wherein each of the plurality of iterative updates of the n-gram data element is further based on a trained long short-term memory (LSTM) neural network that propagates each of the plurality of iterative updates of the n-gram element.

8. A method for segmenting an image, the method comprising:
   receiving an image that includes a plurality of pixels;
   receiving an n-gram that includes an ordered set of tokens based on a phrase that references an object depicted within a first region of the image;
   generating an image data structure that encodes a mapping between each of a plurality of image features corresponding to the image and a corresponding portion of the plurality of pixels;
   generating a set of token data structures;
   employing a first recurrent neural network (RNN) to iteratively generate a segmentation map; and
   segmenting the image based on the iteratively generated segmentation map.

9. The method of claim 8, further comprising:
   iteratively generating an n-gram data structure based on a second RNN and the set of token data structures, wherein the second RNN propagates the n-gram data structure during the iterative generation of the n-gram data structure; and
   iteratively generating the segmentation map further based on a plurality of iteratively generated combinations of the image data structure and the n-gram data structure.

10. The method of claim 8, further comprising:
    training a long short-term memory (LSTM) neural network based on a training data that includes a plurality of other n-grams; and
    employing the trained LSTM as the second RNN.

11. The method of claim 8, wherein the plurality of image features are identified within the image based on an image feature identification model.

12. The method of claim 8, wherein generating a set of token data structures is based on a natural language model and the set of data token structures encodes semantic features of a corresponding token of the set of tokens.

13. The method of claim 8, wherein iteratively generating the segmentation map is further based on a plurality of iteratively generated combinations of the image data structure and portions of the set of token data structures, wherein the first RNN propagates the segmentation map during the iterative generation of the segmentation data structure and the segmentation map identifies a subset of the plurality of pixels that are included in the first region of the image.

14. An image segmentation system for segmenting an image, the system comprising: a processor device; and
    a computer-readable non-transitory storage medium, coupled with the processor device, having instructions stored thereon, which, when executed by the processor device, perform actions comprising:
    receiving an image feature data structure that encodes images features corresponding to an image;
    employing a first recurrent neural network (RNN) to generate an n-gram feature data structure that encodes n-gram features corresponding to an ordered set of tokens included in a natural language phrase that references a portion of the image;
    employing a second RNN to iteratively update a current state of a segmentation
    map based on the image feature data structure and the n-gram feature data structure, wherein the second RNN propagates a current state of the segmentation map;
    generating a segmented image based on the iteratively updated current state of the segmentation map, wherein the segmented image indicates the portion of the image referenced by the natural language phrase.

15. The system of claim 14, the actions further comprising:
generating, using a natural language model, a token vector for each token of the ordered set of tokens included in the n-gram;
iteratively generating, based on a plurality of token vectors corresponding with the ordered set of tokens, an n-gram hidden feature vector;
propagating, using the first recurrent neural model, a current state of the n-gram hidden feature vector; and
iteratively updating, using the current state of the n-gram hidden feature vector, the state of the n-gram hidden feature vector in a subsequent iteration of the iterative generation of the n-gram hidden feature vector.

16. The system of claim 14, the actions further comprising:
employing a convolutional neural network to generate the image feature data structure based on the image;
providing the second RNN the image feature data structure; and
proving the second RNN the n-gram feature data structure.

17. The system of claim 14, wherein the first RNN is a long short-term memory (LSTM) neural network.

18. The system of claim 14, wherein the second RNN is a convolutional multimodal recurrent neural network (mRNN).

19. The system of claim 14, wherein the first RNN iteratively encodes the n-gram feature data structure based on a sequence of the ordered set of tokens.

20. The system of claim 15, the actions further comprising:
employing a deconvolution neural network to iteratively generate the segmented image.

* * * * *